United States Patent
Kinney et al.

(10) Patent No.: US 12,072,835 B2
(45) Date of Patent: Aug. 27, 2024

(54) MULTICORE SYNCHRONIZATION MECHANISM FOR TIME CRITICAL RADIO SYSTEMS

(71) Applicant: Intel Corporation, Santa Clara, CA (US)

(72) Inventors: Kevin Kinney, Coopersburg, PA (US); Zoran Zivkovic, Hertogenbosch (NL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/851,739

(22) Filed: Jun. 28, 2022

(65) Prior Publication Data

US 2023/0418781 A1    Dec. 28, 2023

(51) Int. Cl.
  *G06F 15/80* (2006.01)
  *G06F 1/12* (2006.01)

(52) U.S. Cl.
  CPC ............... *G06F 15/80* (2013.01); *G06F 1/12* (2013.01)

(58) Field of Classification Search
  CPC .................................. G06F 15/80; G06F 1/12
  See application file for complete search history.

(56) References Cited

U.S. PATENT DOCUMENTS

| | | | | |
|---|---|---|---|---|
| 6,674,721 B1* | 1/2004 | Dittia | ...................... | H04L 47/12 370/235 |
| 7,266,672 B2* | 9/2007 | Mirsky | ............... | G06F 15/8023 712/228 |
| 7,564,386 B2* | 7/2009 | Barford | .............. | G01R 13/0272 702/77 |
| 8,443,031 B1* | 5/2013 | Rao | .......................... | G06F 17/16 708/520 |
| 2007/0206560 A1* | 9/2007 | Stratigakis | .......... | H04W 56/008 370/345 |

FOREIGN PATENT DOCUMENTS

| | | | | |
|---|---|---|---|---|
| EP | 1912119 A1 * | 4/2008 | .......... | G06F 9/5066 |
| WO | WO-2014134056 A1 * | 9/2014 | ............... | G06F 1/04 |

* cited by examiner

*Primary Examiner* — Farley Abad
(74) *Attorney, Agent, or Firm* — Banner & Witcoff Ltd.

(57) ABSTRACT

Techniques are disclosed for the use of a hybrid architecture that combines a programmable processing array and a hardware accelerator. The hybrid architecture implements a data driven synchronization process to maintain synchronization between the programmable elements (PEs) of the programmable processing array. The hybrid architecture implements a timer-based solution to ensure data-driven synchronization between the PEs of the programmable processing array meets the time-based synchronization requirements of the overall system. The timers function to introduce a delay or latency to the time required by each of the PEs of the programmable processing array to perform their respective tasks, thereby forcing the hardware blocks to wait to receive the processed data samples output via the PEs and perform their hardware-based computations.

24 Claims, 12 Drawing Sheets

MULTICORE SYNCHRONIZATION MECHANISM FOR TIME CRITICAL RADIO SYSTEMS

TECHNICAL FIELD

The disclosure described herein generally relates to techniques for implementing time delays in systems to facilitate both data- and time-based synchronization between processing elements (PEs) of a programmable processing array and a hardware accelerator.

BACKGROUND

In many applications such as digital front end (DFE) radios, there is a need for fast computations to ensure that the digital data is transmitted and received efficiently. Programmable solutions for DFE radios provide flexibility to adapt the manner in which such computations are performed, but are inefficient in terms of cost and power. For instance, hardwired application specific integrated circuit (ASIC) solutions may be implemented in current DFE radio products, as ASICs are power and cost efficient, but lack the flexibility provided by programmable processing arrays. Programmable processing arrays, on the other hand, although flexible in their implementation, are computationally intensive and thus inefficient in terms of power, and are less cost-effective.

Thus, hybrid systems have been implemented in which a portion of the processing is performed in a traditional streaming fashion in dedicated hardware (HW) blocks, whereas a large portion of processing is performed in a programmable array of cores, which are also referred to as processing elements (PEs) and form part of a programmable processing array. There is a need to properly align data between the hardware blocks and the processing elements, and both hardwired and programmable solutions have various drawbacks in that current solutions are inadequate.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the implementations as discussed herein.

The present disclosure will be described with reference to the accompanying drawings. The drawing in which an element first appears is typically indicated by the leftmost digit(s) in the corresponding reference number.

DETAILED DESCRIPTION

Figure 1:
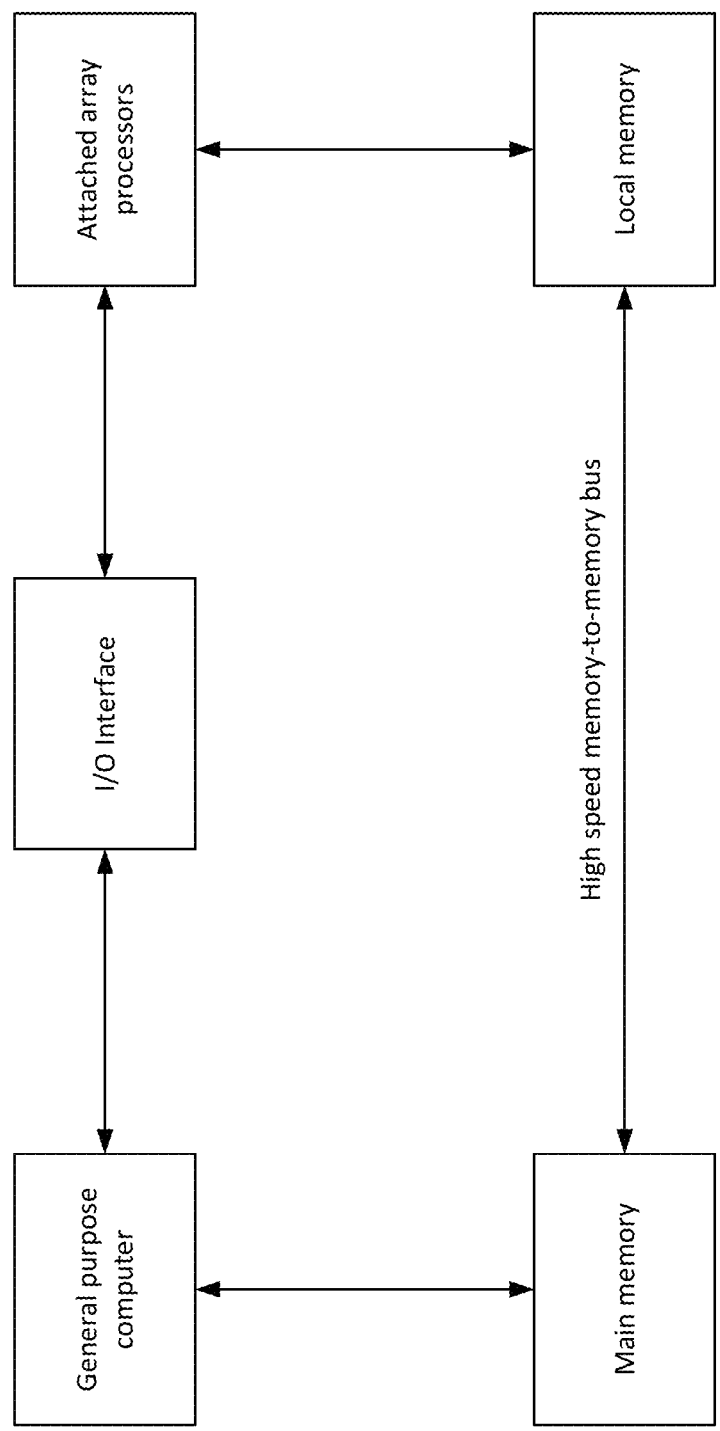
FIG. 1 illustrates an example of a conventional vector processor architecture.

In the following description, numerous specific details are set forth in order to provide a thorough understanding of the present disclosure. However, it will be apparent to those skilled in the art that the implementations of the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

Programmable Processing Array Operation

The programmable processing arrays as discussed in further detail herein may be implemented as vector processors or any other suitable type of array processors, of which vector processors are considered a specialized type. Such array processors may represent a central processing unit (CPU) that implements an instruction set containing instructions that operate on one-dimensional arrays of data referred to as data "vectors." This is in contrast to scalar processors having instructions that operate on single data items. Vector processors can greatly improve performance on certain workloads, notably numerical simulation and similar tasks, by utilizing a number of execution units, which are alternatively referred to herein as cores, execution units processing units, functional units, or processing elements (PEs), and which independently execute specific functions on incoming data streams to achieve a processing flow.

Generally speaking, conventional CPUs manipulate one or two pieces of data at a time. For instance, conventional CPUs may receive an instruction that essentially says "add A to B and put the result in C," with 'C' being an address in memory. Typically, the data is rarely sent in raw form, and is instead "pointed to" via passing an address to a memory location that holds the actual data. Decoding this address and retrieving the data from that particular memory location takes some time, during which a conventional CPU sits idle waiting for the requested data to be retrieved. As CPU speeds have increased, this memory latency has historically become a large impediment to performance.

Thus, to reduce the amount of time consumed by these steps, most modern CPUs use a technique known as instruction pipelining in which the instructions sequentially pass through several sub-units. The first sub-unit reads and decodes the address, the next sub-unit "fetches" the values at those addresses, while the next sub-unit performs the actual mathematical operations. Vector processors take this concept even further. For instance, instead of pipelining just the instructions, vector processors also pipeline the data itself. For example, a vector processor may be fed instructions that indicate not to merely add A to B, but to add all numbers within a specified range of address locations in memory to all of the numbers at another set of address locations in memory. Thus, instead of constantly decoding the instructions and fetching the data needed to complete each one, a vector processor may read a single instruction from memory. This initial instruction is defined in a manner such that the instruction itself indicates that the instruction will be repeatedly executed on another item of data, at an address one increment larger than the last. This allows for significant savings in decoding time.

Figure 2:
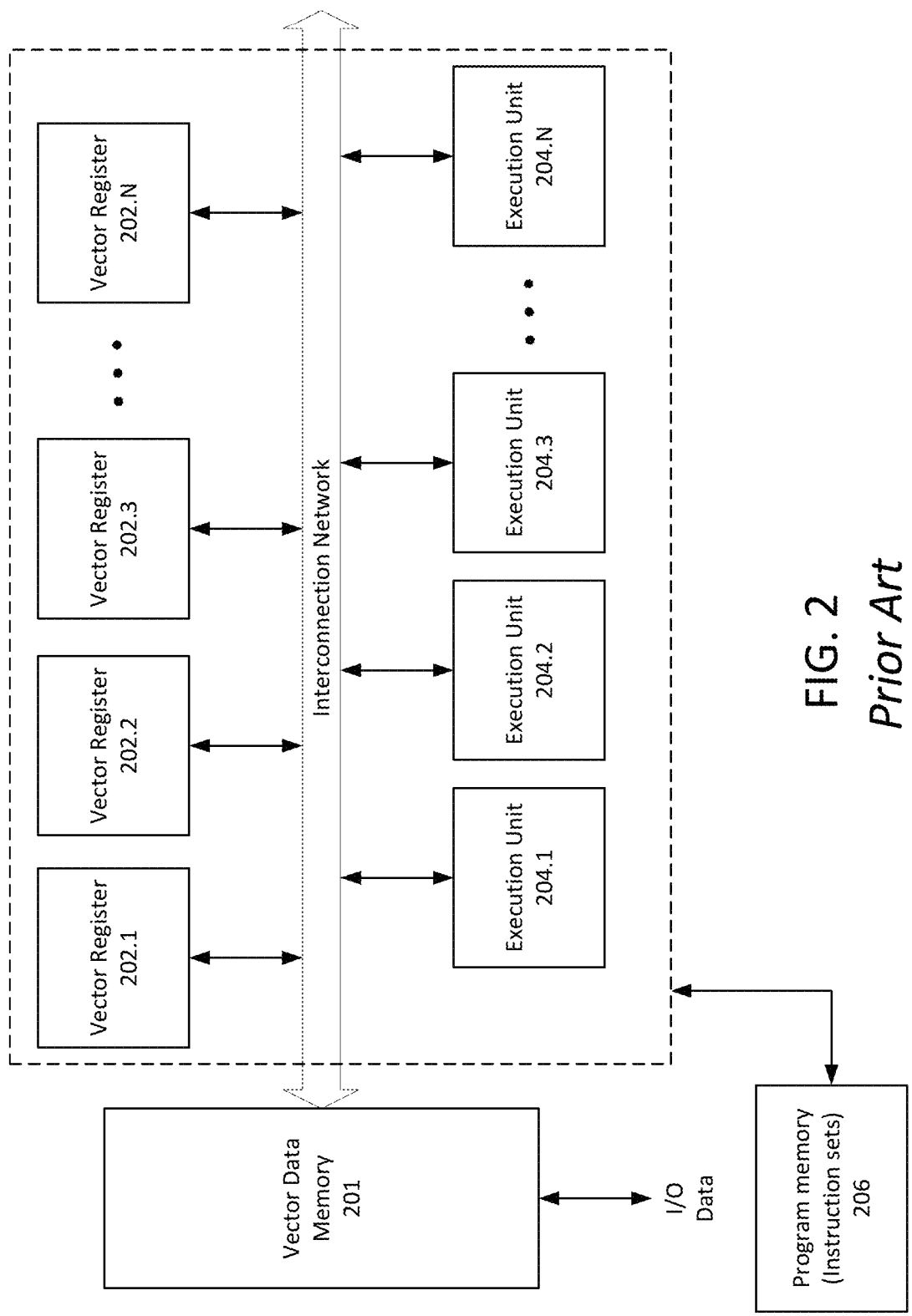
FIG. 2 illustrates another example of a conventional vector processor architecture.

Vector processors may be implemented in accordance with various architectures, and the various programmable array processor architectures as discussed throughout the disclosure as further described herein may be implemented in accordance with any of these architectures or combinations of these architectures, as well as alternative processing array architectures that are different than vector processors. FIGS. 1 and 2 provide two different implementations of a vector processor architecture. FIG. 1 illustrates an attached vector processor, which is attached to a general purpose computer for the purpose of enhancing and improving the performance of that computer in numerical computational tasks. The attached vector processor achieves high performance by means of parallel processing with multiple functional units.

FIG. 2, on the other hand, shows an example of a single instruction stream, multiple data streams (SIMD) vector processor architecture. The vector processor architecture 200 as shown in FIG. 2 may have an architecture consisting of one or more execution units. Each execution unit is capable of executing one instruction. Each instruction can be a control, load/store, scalar, or a vector instruction. Therefore, a processor architecture with N execution units 204.1-204.N as shown in FIG. 2 can issue as many as N instructions every clock cycle. The execution units 204.1-204.N function under the control of a common control unit (such as processing circuitry), thus providing a single instruction stream to control each of the execution units 204.1-204.N. The I/O data as shown in FIG. 2 is typically identified with data communicated between the vector processor 200 and another data source or processor (which may be the common control unit or another processor), depending upon the particular application. The vector data memory 201 thus stores data received as input to be processed by the execution units 204.1-204.N, and data that is output or read from the vector data memory 201 after the data is processed. The vector processor architecture 200 as shown in FIG. 2 is an example of a load-store architecture used by vector processors, which is an instruction set architecture that divides instructions into two categories: memory access (loading and storing data between the vector data memory 201 and the vector registers 202.1-202.N) and the vector processing operations performed by the execution units 204.1-204.N using the data retrieved from and the results stored to the vector registers 202.1-202.N.

Thus, the load-store instruction architecture facilitates data stored in the vector data memory 201 that is to be processed to be loaded into the vector registers 202.1-202.N using load operations, transferred to the execution units 204.1-204.N, processed, written back to the vector registers 202.1-202.N, and then written back to the vector data memory 201 using store operations. The location (address) of the data and the type of processing operation to be performed by each execution unit 204.1-204.N is part of an instruction stored as part of the instruction set in the program memory 206. The movement of data between these various components may be scheduled in accordance with a decoder that accesses the instructions sets from the program memory, which is not shown in further detail in FIG. 2 for purposes of brevity. The interconnection network, which supports the transfer of data amongst the various components of the vector processor architecture 200 as shown in FIG. 2, is generally implemented as a collection of data buses and may be shared among a set of different components, ports, etc. In this way, several execution units 204.1-204.N may write to a single vector register 202, and the data loaded into several vector registers 202.1-202.N may be read by and processed by several of the execution units 204.1-204.N.

The use of instruction sets in accordance with the vector processor architecture 200 is generally known, and therefore an additional description of this operation is not provided for purposes of brevity. Regardless of the particular implementation, vector processors can greatly improve performance on certain workloads but have various drawbacks. For instance, and as noted above, vector processors may form part of what is referred to herein as a programmable processing array, which are traditionally computationally intensive, expensive, and suffer from power inefficiencies. As a result, such programmable vector processors may not be ideal for mobile or base station applications that implement DFE architectures. Furthermore, and as noted above, hardwired ASIC solutions are fast and efficient in terms of power consumption, but lack the flexibility provided by the programmable nature of the vector arrays.

Digital Front End (DFE) Computations

It is noted that current products such as DFEs typically implement either programmable or hardware-based solutions, each resulting in the tradeoffs as noted above. For instance, DFEs may implement a hardwired ASIC as shown in FIG. 3A to perform DFE functions such as digital pre-distortion (DPD) calculations. Thus, a hardwired ASIC in such implementations represents a customized and optimized hardware solution that performs specific types of calculations in accordance with the specific set of operating parameters of the DFE. As a result, although such hardware ASIC solutions are fast and efficient in terms of power, such architectures lack flexibility and typically cannot be adapted to other DFEs or other applications.

Figure 3B:
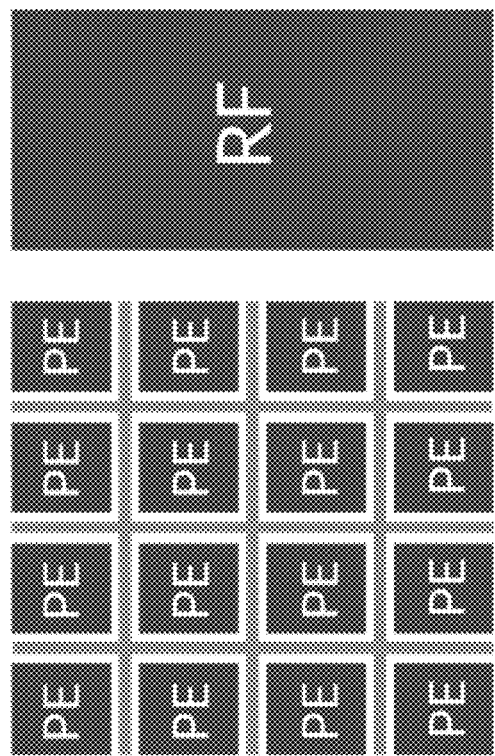
FIG. 3B illustrates programmable processing arrays for performing digital front end (DFE) functions.
Figure 3A:
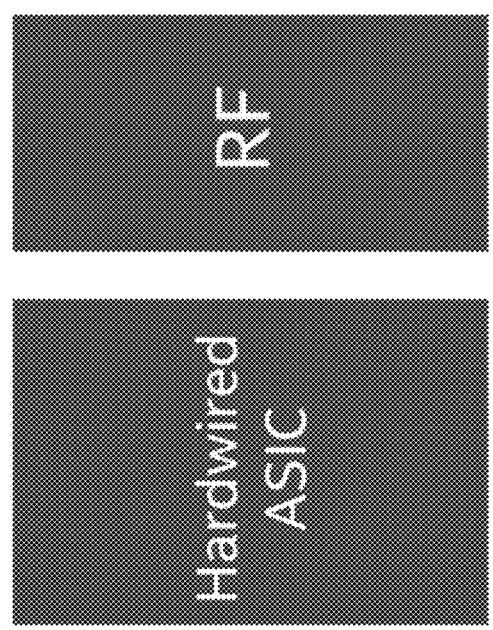
FIG. 3A illustrates a conventional hardwired solution for performing DFE functions.

Thus, other solutions for performing DFE functions include the use of programmable processing arrays as shown in FIG. 3B. Such solutions are typically implemented as field programmable gate arrays (FPGAs) or a mesh of processors with interconnections connecting the programmable processing elements (PEs), which provides some flexibility to adapt how the DFE functions are performed across different products. Thus, such solutions alternatively implement the use of the PEs to perform DFE functions. As a result, such solutions provide flexibility to adapt the manner in which DFE functions are performed, but do so using increased power and added cost compared to hardwired ASIC solutions.

Furthermore, to the extent that hybrid solutions are implemented, FPGA suppliers have elected to implement some of the processing components as hardware blocks. However, such products still fail to implement a hybrid solution in which the programmable components are realized as a programmable processing array. Moreover, such hybrid solutions are still not very power efficient, as these are based on FPGA solutions.

The disclosure as further described herein addresses these issues by implementing a hybrid architecture that combines the benefits of a programmable processing array architecture (also referred to herein as a processing array) and a hardware-based architecture, which is also referred to herein as a hardware accelerator. Thus, the disclosure is directed to a hybrid architecture that couples a processing array to a hardware accelerator. This results in a splitting of functionality and accompanying defined connections and interfaces to provide a balance between power/area and flexibility.

As further described below, the hardware accelerator may implement one of more hardware blocks that may execute specific and./or predetermined functions based upon the particular application. These functions may include DFE functions as further discussed herein and, in some scenarios, may include the use of LUTs that store entries identified with the terms of the particular function that is to be evaluated. The PEs are identified with sets of PEs that form part of the processing array, which work in conjunction with the hardware blocks of the hardware accelerator to form an overall system. This system may be implemented as any suitable platform such as a network-based system, as a system on a chip (SoC), or other suitable architecture, and may form part of and/or communicate with a particular device based upon the particular implementation and application, such as a base station or any suitable type of wireless communication device, a graphics processing unit (GPU), etc.

It is noted that the implementations as described herein are provided with respect to the use of the hybrid architecture with or as part of a DFE, as such implementations are particularly useful for such applications. However, the hybrid architecture as described herein is not limited to implementations in DFEs and/or wireless communications. The hybrid architecture as discussed herein may be implemented in accordance with any suitable application in which data-driven synchronization is used in conjunction with a time-based synchronization of an overall system.

However, in the context of a radio system, it is noted that typical radio systems have tight timing control using a dedicated set of timers and micro controllers to control the processors and data communication between them. Thus, an additional cost is conventionally accrued due to the hardware and software for the additional timing and control system to meet these demands. Moreover, conventionally the PEs in the processing array are not self-synchronized based on the data, i.e. conventional processing arrays do not utilize data-driven synchronization, which may lead to potential errors.

Therefore, the hybrid architecture solutions as further described herein advantageously address these issues by implementing a data-driven synchronization process to enable the PEs of the processing array to maintain self-synchronization between one another. That is, certain applications such as wireless communications require the hardware blocks, the radio system components, and/or the system as a whole to meet time-based synchronization requirements to ensure that data is transmitted, received, and processed in real time based upon the requirements of the specific communication protocol that is used. Thus, the hybrid architecture to which the disclosure is directed implement an artificially-generated latency in one or more PEs of the processing array to ensure that the data-driven synchronization between the PEs of the programmable processing array meets the time-based synchronization requirements of the hardware accelerator. As discussed in further detail herein, the latency delays the transmission of the data after a PE has completed its respective processing operations. This reduces the time interval (and thus the size of the memory buffers required to store arrays of data samples during those time intervals) between when the data is transmitted from the last PE to perform processing operations and when the hardware accelerator expects to receive the arrays of processed data samples to perform hardware-based computations.

Thus, the hybrid architecture solutions discussed herein leverage a data-driven synchronization methodology to self-synchronize the PEs based upon the received data. Timers are implemented in various configurations, and specific processor instructions and controls are utilized to enable fine tuning and control of the data transfers. The data driven synchronization of the PEs allows for easier maintenance of the self-synchronization and is less error prone. Adding timers per processing element (as well as in other configurations) also enables fine tuning and control of the data transfers to the other tightly timed processing blocks in the system, and reduces the need for large synchronization buffers. That is, although a buffer or memory is implemented, the use of the timers in conjunction with data-driven synchronization enables the size of the buffers to be significantly reduced, thereby saving manufacturing costs.

A Hybrid Programmable Processing Array and Hardware Accelerator Architecture

Figure 4:
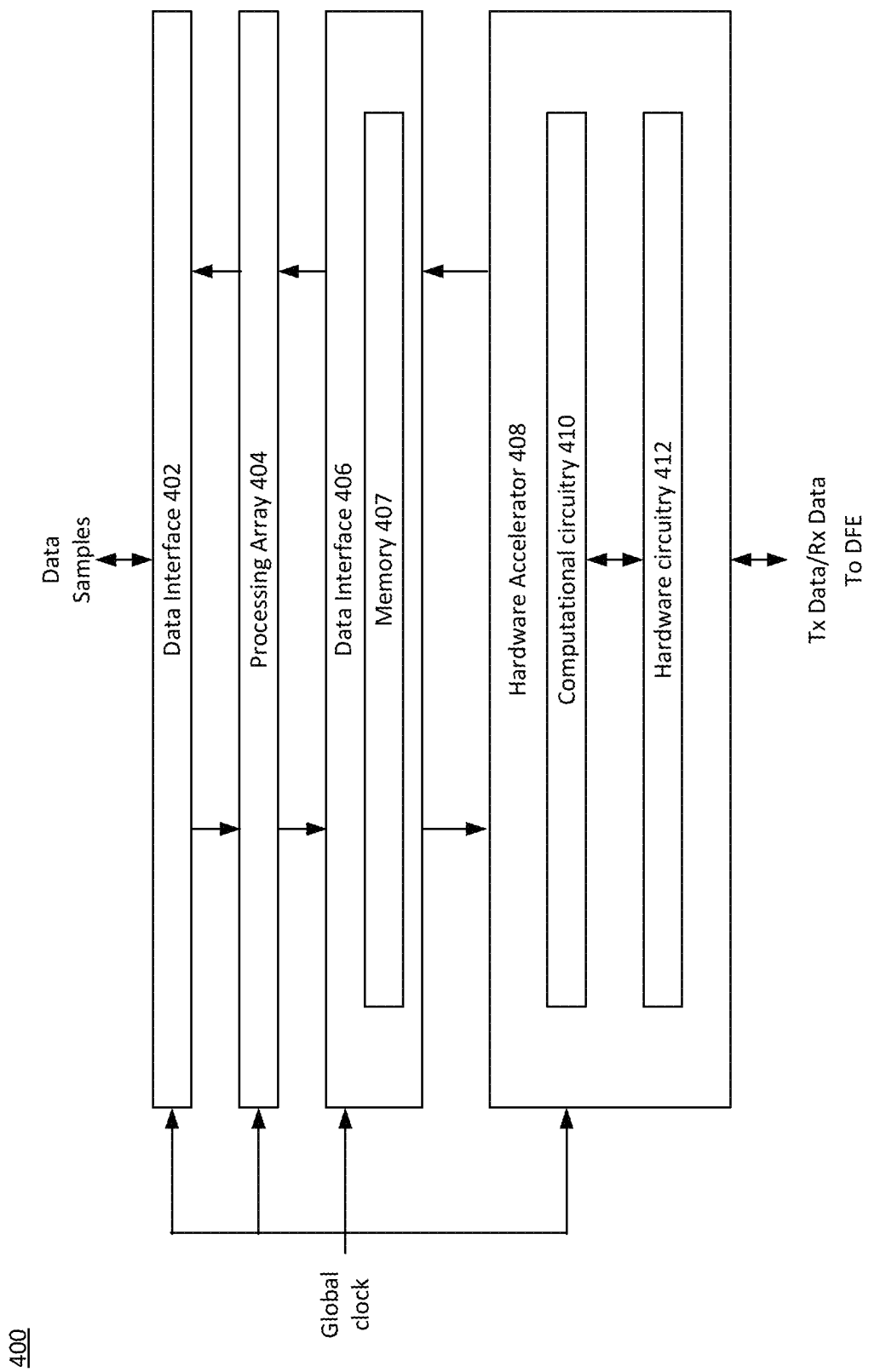
FIG. 4 illustrates a block diagram of a hybrid programmable processing array and hardware accelerator architecture, in accordance with the disclosure.

FIG. 4 illustrates a block diagram of a hybrid programmable processing array and hardware accelerator architecture, in accordance with the disclosure. The various components of the hybrid architecture 400 as shown in FIG. 4 may be implemented on a single chip, such as a system on a chip (SoC), or on separate chips or SoCs. The implementation of the hybrid architecture 400 as part of an SoC may be particularly advantageous for applications using high data rates, as doing so obviates the need to couple signals between different chips or via other external devices.

As further discussed herein, the hybrid architecture 400 implements a programmable processing array 404 (again also referred to herein as a processing array) configured to perform processing operations on received arrays of data samples, which may be executed in response to instructions that are transmitted to the individual PEs of the processing array. The hybrid architecture 400 also implements a hardware accelerator 408 configured to perform hardware-based computations, referred to herein as processing functions, on received arrays of data samples, which may include predetermined and/or hardware-based processing operations. Thus, the hybrid architecture 400 functions to implement the PEs of the processing array 404 to receive arrays of data samples, to perform processing operations on the received arrays of data samples in accordance with received instructions, and then generate an array of output data samples after such operations have been performed. Moreover, the hybrid architecture 400 functions to implement hardware blocks of the hardware accelerator 408 to receive either the arrays of output data samples provided by the PEs, which are converted to a data format recognized by the hardware accelerator 408 or, alternatively, to receive data from another source such as the DFE RX path. The hardware blocks of the hardware accelerator 408 are thus configured to perform various hardware-based computations on those data samples, and then generate output data samples after such hardware-based computations have been performed.

The processing operations and the hardware-based computations performed by the PEs and the hardware blocks may be, in some scenarios, various DFE-based functions. Such DFE-based functions may include, in various illustrative and non-limiting scenarios, digital signal processing operations that are associated with wireless data communications, the application and/or calculation of finite impulse response (FIR) filter contributions to a digital data stream, equalizer functions, the calculation of digital pre-distortion (DPD) coefficients or terms, the application or calculation of Fast Fourier Transforms (FFTs) and/or digital Fourier Transforms (DFTs), matrix operations, mixer and/or frequency correction calculations, peak detection and/or cancellation calculations, signal measurements, average signal measurement calculations over time, digital signal processing of signals transmitted or received via individual antenna data streams for multiple-input-multiple-output (MIMO) antenna systems, etc.

Furthermore, the arrays of data samples processed by the PEs and/or the hardware blocks as discussed herein may be obtained from an in-phase (I) quadrature-phase (Q) data stream, and may be processed prior to data transmission of wireless signals or after receiving wireless signals. The hybrid architecture 400 may additionally or alternatively be used to perform any suitable type of data computations or other functions in which data processing operations may be performed on arrays of data samples. In one illustrative scenario, the hybrid architecture 400 may be implemented as part of graphics processing unit (GPU) to perform graphics processing and/or rendering. Such operations may be performed in accordance with wireless communications or any other suitable application in accordance with any suitable techniques to do so, including known techniques and those discussed herein.

As discussed in further detail below, the processing array 404 may be implemented as any suitable type of programmable array architecture that includes an array of processing elements (PEs). These processing array 404 may implement any suitable number and/or type of PEs having any level of programmable functionality depending upon the particular application. In some scenarios, the processing array 404 may be implemented as a programmable vector processor having any suitable configuration and design as noted herein. As noted above, a vector processor may include any suitable type of processor that implements an instruction set using instructions designed to operate efficiently and effectively on large one-dimensional arrays of data samples, which may alternatively be referred to as vectors or data vectors. The processing array 404 may, when implemented as a vector processor, implement as the PEs any suitable number of execution units, which may also be referred to as cores, and which may be configured in any suitable manner as further discussed herein. In other scenarios, the processing array 404 may alternatively be implemented with any suitable number of alternate PEs. In accordance with such alternative scenarios, the processing array 404 may include, as the PEs, digital signal processor (DSP) blocks and/or PEs identified with an FPGA, individual DSP processing blocks of a larger DSP, etc.

In any event, the processing array 404 may receive, transmit, and/or perform processing operations on arrays of data samples, which may alternatively be referred to herein as data vectors regardless of the particular implementation of the processing array 404. Each array of data samples may thus represent any suitable number of data samples. The processing array 404 thus provides flexibility in the computations performed, as the processing array 404 may access instruction sets or otherwise be programmed to perform specific functions, which may include processing operations, the specific type of processing operations being a function of the particular implementation of the processing array 404 and the instructions that are executed at a particular time. That is, scenarios include the PEs of the processing array 404 performing processing operations on the arrays of data samples as discussed herein to provide data bit manipulation, formatting, truncation, mathematical computations, etc.

Depending upon the current instructions provided to the individual PEs of the processing array 404, the PEs may or may not modify the values of the data samples. In some scenarios, the PEs may receive an array of data samples as input, which are then output and transferred to the hardware accelerator 408 (or another PE) without modifying their values as a result of the execution of the processing operations. This may include the use of processing operations that may reorder, reformat, or reorganize the arrays of data samples. In other scenarios, the processing operations may include modifying an array of data samples received as input, which are then output and provided to the hardware accelerator 408 (or another PE). Thus, each PE of the processing array 404 may perform processing operations on an array of input data samples to provide an array of output data samples. These processing operations may represent any suitable type of task such that the output data samples may represent a modification, bit manipulation, formatting, truncation, mathematical computations, etc. on the array input data samples. Thus, these processing operations may alternatively be referred to herein as "tasks" and represent any suitable type of operation that is performed via a respective PE on a respective array of input data samples to provide a respective array of output data samples.

The data interface 402 may represent any suitable type of data interface that is configured to transfer data samples between any suitable data source and the hybrid architecture 400. Thus, the data interface 402 may be implemented as any suitable type of data interface for this purpose, such as a standardized serial interface used by data converters (ADCs and DACs) and logic devices (FPGAs or ASICs), and which may include a JESD-based standard interface and/or a chip-to-chip (C2C) interface. The data samples provided by the data source may be in a data array format or provided as streaming (i.e. serial) data bit streams. In the latter case, the data interface 402 may implement any suitable type and/or number of hardware and/or software components, digital logic, etc., to manage the translation of the streams of data bit samples to the data format implemented via the processing array 404, and vice-versa (i.e. when data is provided from the processing array 404 to the data source). The data interface 402 may be configured to transfer data in accordance with fixed time intervals, which may be a function of the global clock signal and depend upon the particular application and/or implementation. In one illustrative and non-limiting scenario in which the hybrid architecture 400 is implemented as part of a base station or other wireless communication device, the data interface 402 may transmit and/or receive data samples in accordance with the global clock signal used as part of the base station processing operations, which may include the use of a B node frame number (BFN) as discussed herein.

In accordance with the present illustrative scenario in which the processing array 404 is implemented as part of a DFE, the data source may comprise a data modem, to which the data interface 402 may be coupled to facilitate the transmission and reception of data in accordance with any suitable data rate and/or communication protocol. In accordance with conventional DFE applications that use hard-wired solutions as noted herein, the data interface 402 may typically be coupled directly to such components. However, to provide the hybrid functionality as discussed herein to realize the benefits of both programmable and hardwired implementations, the hybrid architecture 400 includes the data interface 402 being coupled to the processing array 404, which is in turn coupled to the hardware accelerator 408 via another data interface 406, as discussed in further detail below.

The data interface 402 may thus to be configured to provide data that is to be transmitted via a DFE to the hybrid architecture 400 in a timed or otherwise synchronized manner using the global clock signal. The data may be converted to arrays of data samples upon which the processing operations are then performed via the PEs of the processing array 404, and then converted back to a stream of data samples on which the hardware accelerator 408 performs processing functions to provide sets of output data samples that are used to provide the TX data. Furthermore, and as further discussed herein, the data interface 406 may be configured to provide the RX data that is received via a DFE to the hybrid architecture 400. The RX data may represent a stream of data samples on which the hardware accelerator 408 performs processing functions, and which are then converted to arrays of data samples upon which the processing operations are then performed via the PEs of the processing array 404. Upon completion of the processing operations via the PEs of the processing array 404, the arrays of output data samples are provided to the data interface 402, converted back to streams of data samples, and then transmitted to the data source where the data may be suitably demodulated, decoded, etc.

The data interface 406 thus functions to transfer the array of data samples from each PE of the processing array 404 after processing operations have been performed to the hardware accelerator 408. The data interface 406 may implement any suitable type and/or number of hardware and/or software components, digital logic, etc., to manage the translation of data from the arrays of data samples implemented via the processing array 404 to the data format implemented via the hardware accelerator 408, and vice-versa (i.e. when data is provided from the hardware accelerator 408 to the processing array 404). The data interface 406 may function in a similar or identical manner as the data interface 402 as described above. Thus, the data interface 406 may be configured to transmit and/or receive data in a timed or otherwise synchronized manner using the global clock signal. Again, the global clock signal may be implemented as part of the base station processing operations, which may include the use of a B node frame number (BFN) as discussed herein.

The data interfaces 402 and 406 may thus be adapted to a particular application. In one scenario in which the hybrid architecture 400 is implemented as part of a wireless communication device, each of the PEs in the processing array 404 may be coupled to the data interfaces 402, 406 via any suitable number and/or type of data interconnections, which may include wired buses, ports, etc. The data interfaces 402, 406 may thus be implemented as a collection of data buses that couple each port (which may represent an individual channel or grouping of individual PEs in the processing array 404) to a data source via a dedicated data bus. Although not shown in detail in the Figures, in accordance with such scenarios each data bus may be adapted for use in a DFE used for wireless communications, and thus the dedicated buses may include a TX and an RX data bus per port in this non-limiting scenario.

The hybrid architecture 400 also comprises a hardware accelerator 408, which is configured to execute predetermined processing functions on received data samples in accordance with any suitable type of hardwired architecture, such as an ASIC, a DSP, etc. Using the previous scenario of a DFE and data to be transmitted, this may include the hardware accelerator 408 performing one or more predetermined processing functions on the arrays of data samples output via the PEs of the processing array 404 and/or performing one or more predetermined processing functions on data samples received via the DFE or other suitable data source.

The hardware accelerator 408 may implement any suitable number and/or type of processors and/or processing circuitry for this purpose, which may be partially or wholly represented by the hardware (HW) computation circuitry 410 and the HW circuitry 412, and which may collectively form the HW "blocks" of the hardware accelerator 408 as referred to herein. Again, the data interface 406 is configured to convert the arrays of data samples to a data format that is recognized by the hardware accelerator 408. This may include temporarily storing the arrays of output data samples provided by the processing array 404 in the memory 407. The memory 407 may be implemented as any suitable type of memory of any suitable size depending upon the particular application. The memory 407 represents any suitable type of storage such as volatile or a non-volatile memory, and which may have any suitable size, addressable space, and address configuration depending upon the size of the array of data samples that are loaded. The data stored in the memory 407 may be stored as arrays of data samples after processing operations have been performed by the PEs within each respective port, and thus the memory 407 may be partitioned, formatted, or otherwise organized in accordance with any suitable addressing scheme. The addressing scheme, size of data contained at each address, and/or the addressable range of the memory 407 is a function of the number of PEs per port, as well as the size of the array of data samples used by the PEs of the processing array 404. In various scenarios, the memory 407 may be sized to store any suitable number of data samples such as 16K, 32K, 64K, 128K, etc. The memory 407 may thus function as a data buffer to enable the hardware accelerator 408 to perform processing operations on the arrays of data samples transferred from the processing array 404.

The computational circuitry 410 may comprise any suitable number and/or type of processing circuitry, logic, and/or other suitable components to retrieve the arrays of output data samples that are (in the data transmitting scenario), generated by the PEs of the processing array 404 and loaded into the memory 407 via the data interface 406. To do so, and as further discussed herein, the computational circuitry 410 is configured to read a range of addresses from the memory 407. The size and range of the addresses accessed by the hardware accelerator 408 may be controlled via a system or host processor of which the hybrid architecture 400 is implemented, and/or may be predetermined based upon the size of the array of data samples used by the hybrid architecture 400. Thus, the hardware accelerator 408 is provided with information regarding a specific address range of the memory 407 to access a specific array of data samples output by a respective PE of the processing array 404. In this way, the hardware accelerator 408 may perform the processing functions on data samples that correspond to the arrays of data samples output via the PEs. However, and as further discussed herein, to save costs, a balance is sought with respect to the memory 407 having a relatively small size, but also being large enough to ensure that the memory does not fill up with arrays of output data samples prior to the hardware accelerator 408 being able to access those arrays of data samples to perform the predetermined processing functions.

This issue is a result of wireless radios (such as base stations) generally functioning in accordance with a predetermined timing synchronization schedule that is based upon a global clock signal. That is, the final stages of processing, which may be performed by the hardware accelerator 408 or another part of the transmit chain, DFE, etc., typically implements processing that is executed "sample by sample," which is then transmitted to the antenna and, as a result, such sample-by-sample timing requires the use of a constant time synchronization. Thus, this global clock signal may be used to perform time-synchronization of the hybrid architecture 400 with an overall system in which the hybrid architecture 400 is implemented.

The global clock signal is shown in FIG. 4, and is used to synchronize the overall flow of data to be transmitted, data that is received, when instructions are to be sent to the PEs of the processing array 404 (although the PEs are self-synchronized otherwise) and otherwise functions to facilitate time-based synchronization of the various components of the hybrid architecture 400. Thus, the global timer may be implemented as or reference a B node frame number (BFN) or other suitable global clock used to maintain synchronicity of data flow to meet any suitable type of communication standard or other requirements of the system in which the hybrid architecture 400 is implemented.

In other words, using a scenario in which data is to be transmitted, the hardware accelerator 408 expects arrays of data samples to be ready for processing at specific sequential time intervals referenced to the global clock signal. Due to the real time operation of the hardware accelerator 408, if these arrays of data samples are not available at this time, then the data samples are lost, as the processing functions cannot be performed at a later time. Moreover, if the PEs provide the data samples earlier than the hardware accelerator is expected to perform the processing functions, the size of the memory 407 needs to be increased to account for this delay. These issues are addressed via the introduction of a latency time period after the PEs perform processing operations combined with a data-driven synchronization of the PEs, the details of which are further discussed below.

The hardware accelerator 408 also comprises hardware (HW) circuitry 412, which is configured to execute the predetermined processing functions on the arrays of data samples retrieved from the memory 408. These arrays of data samples may correspond to the arrays of output data samples generated via the PEs of the processing array 404 as noted above. Alternatively, the HW circuitry may execute the predetermined processing functions on data samples received via the DFE or other suitable data source, which may be provided from part of an RX chain. In any event, the HW circuitry 412 may include any suitable number of HW blocks configured to execute predetermined hardware-based computations based upon the particular application. In one scenario, the HW blocks may comprise LUTs containing entries that are based upon the particular computational application for which the hybrid architecture 400 is implemented.

In any event, the hardware accelerator 480 is configured to perform predetermined processing functions on the array of data samples transferred via the data interface 406 (in the case of data transmissions) to generate processed data samples. These processed data samples may include a set of computed terms in accordance with the particular application for which the function or LUT entries corresponds, as the case may be. In one scenario, the HW circuitry 412 may comprise any suitable number (such as 24, 48, etc.) of LUTs, each containing a set of digital data entries or values. The entries in the LUTs may correspond to a set of computed terms that enable a particular mathematical function to be evaluated using the output data samples retrieved from the memory 407 as inputs, which may include the array of data samples provided by the data interface 406 after the processing operations have been performed via the PEs of the processing array 404. As one illustrative scenario in which DPD terms are computed as noted above and the hybrid architecture 400 may be implemented as part of the DFE of a wireless communication device, the predetermined processing function executed via the HW circuitry 412 may be identified with the application of the DPD terms to a transmitted data stream in accordance with any suitable techniques, including known techniques, digital-to-analog conversion, analog-to-digital conversion (for the RX data path), up-conversion to a transmission frequency, down-conversion to an IF or baseband frequency, additional filtering, etc.

Figure 5:
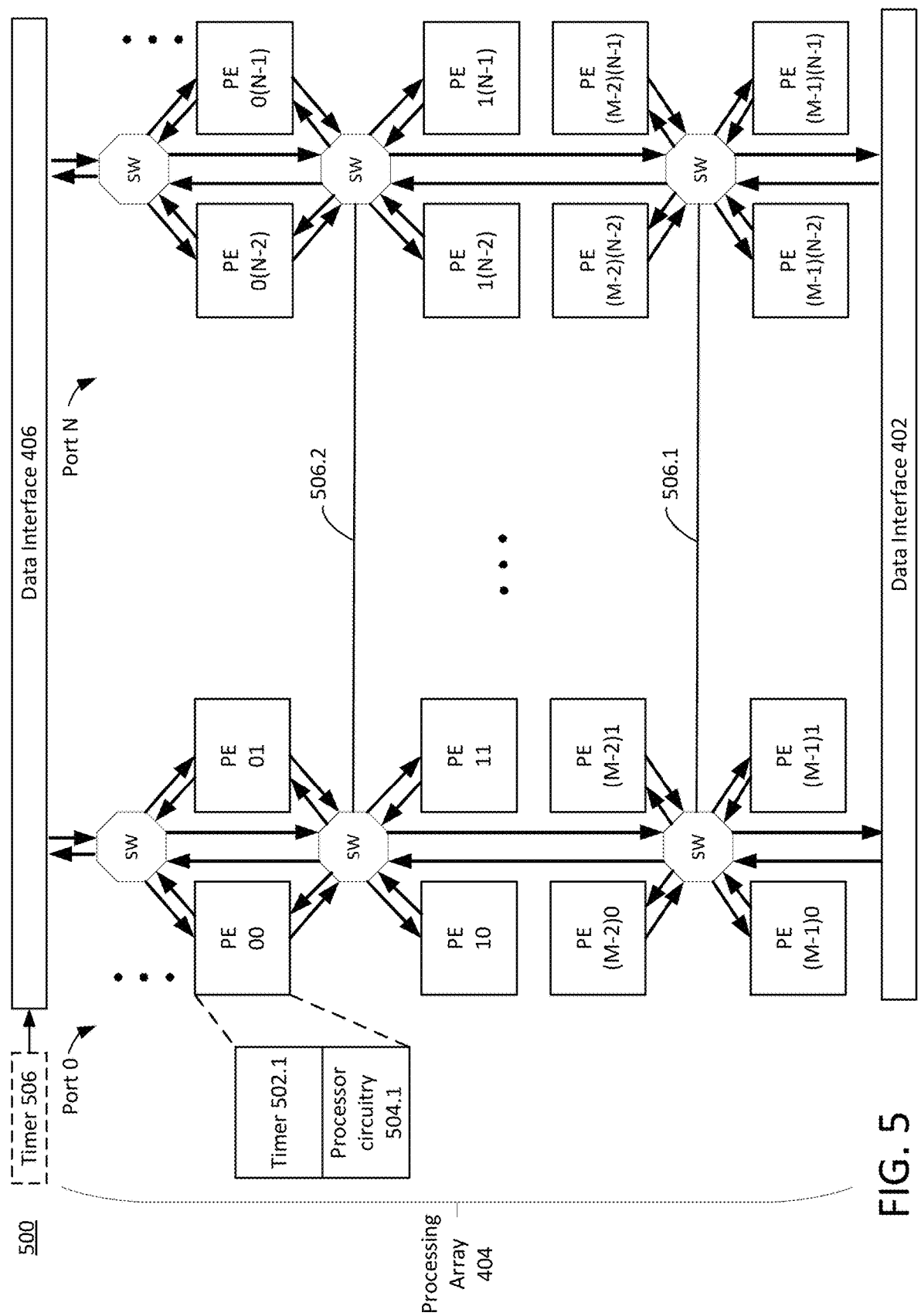
FIG. 5 illustrates a block diagram showing details of a portion of a programmable processing array identified with a hybrid architecture, in accordance with the disclosure.

FIG. 5 illustrates a block diagram showing details of a portion of a programmable processing array identified with a hybrid architecture, in accordance with the disclosure. The hybrid architecture portion 500 as shown in FIG. 5 further illustrates details of the processing array 404 as shown in FIG. 4. Thus, the processing array 404 may include any suitable number N of ports, with each port including any suitable number M of processing elements (PEs). Although each port is shown in FIG. 5 as including 8 PEs, this is for ease of explanation and brevity, and the processing array 404 may include any suitable number of such PEs per port. Thus, the processing array 404 may include a mesh of PEs, the number of which being equal to the number of PEs per port (M) multiplied by the total number of ports (N). Thus, for an illustrative scenario in which the processing array 404 includes 8 ports and 8 PEs per port, the processing array 404 would implement (M×N)=(8×8)=64 PEs. Moreover, in accordance with such a configuration, each port may be identified with a respective antenna that is used as part of a multiple-input multiple-output (MIMO) communication system. Thus, the number of antennas used in accordance with such systems may be equal to the number N of ports, with each port being dedicated to a data stream transmitted and received per antenna.

Each of the PEs in each port of the processing array 404 may be coupled to the data interfaces 402, 406, and each PE may perform processing operations on an array of data samples retrieved from the data interfaces 402, 406 as discussed herein. The access to the array of data samples included in the PEs may be facilitated by any suitable configuration of switches (SW), as denoted in FIG. 5 via the SW blocks. The switches within each of the ports of the processing array may also be coupled to one another via interconnections 506.1, 506.2, with two being shown in FIG. 5 for the illustrative scenario of each port including 8 PEs. Thus, the interconnections 506.1, 506.2, function to arbitrate the operation and corresponding data flow of each grouping of 4 PEs within each port that are respectively coupled to each local port switch. The flow of data to a particular grouping of PEs and a selection of a particular port may be performed in accordance with any suitable techniques, including known techniques. In one illustrative scenario, this may be controlled by referencing the global system clock or other suitable clock via an SoC, network, system, etc., of which the hybrid architecture 400 forms a part.

Thus, at any particular time, one or more of the PEs may access an array of data samples provided on one of the data buses to perform processing operations, with the results then being provided (i.e. transmitted) onto another respective data bus. In other words, any number and combination of the PEs per port may sequentially or concurrently perform processing operations to provide an array of processed (i.e. output) data samples to another PE or to the data interfaces 402, 406 via any suitable data bus. The decisions regarding which PEs perform the processing operations may be controlled via operation of the switches, which may include the use of control signals in accordance with any suitable techniques to do so, including known techniques. However, and as further discussed below, the data interface 406 functions to couple the processing array 404 to the hardware accelerator 408, and thus knowledge regarding which PE has provided the array of output data samples and at what time is leveraged via a system, host processor, etc. of which the hybrid architecture 400 is implemented to facilitate the hardware accelerator 408 being provided with a specific set of output data samples to perform processing functions at the correct time and in accordance with the predetermined timing schedule as noted herein. Again, this timing information may be known and/or derived by the SoC, network, system, etc., of which the processing array 404, the data interfaces 402, 406, and the hardware accelerator 408 form a part by referencing the global system clock or other suitable clock for this purpose.

Data Driven Synchronization

Figure 6A:
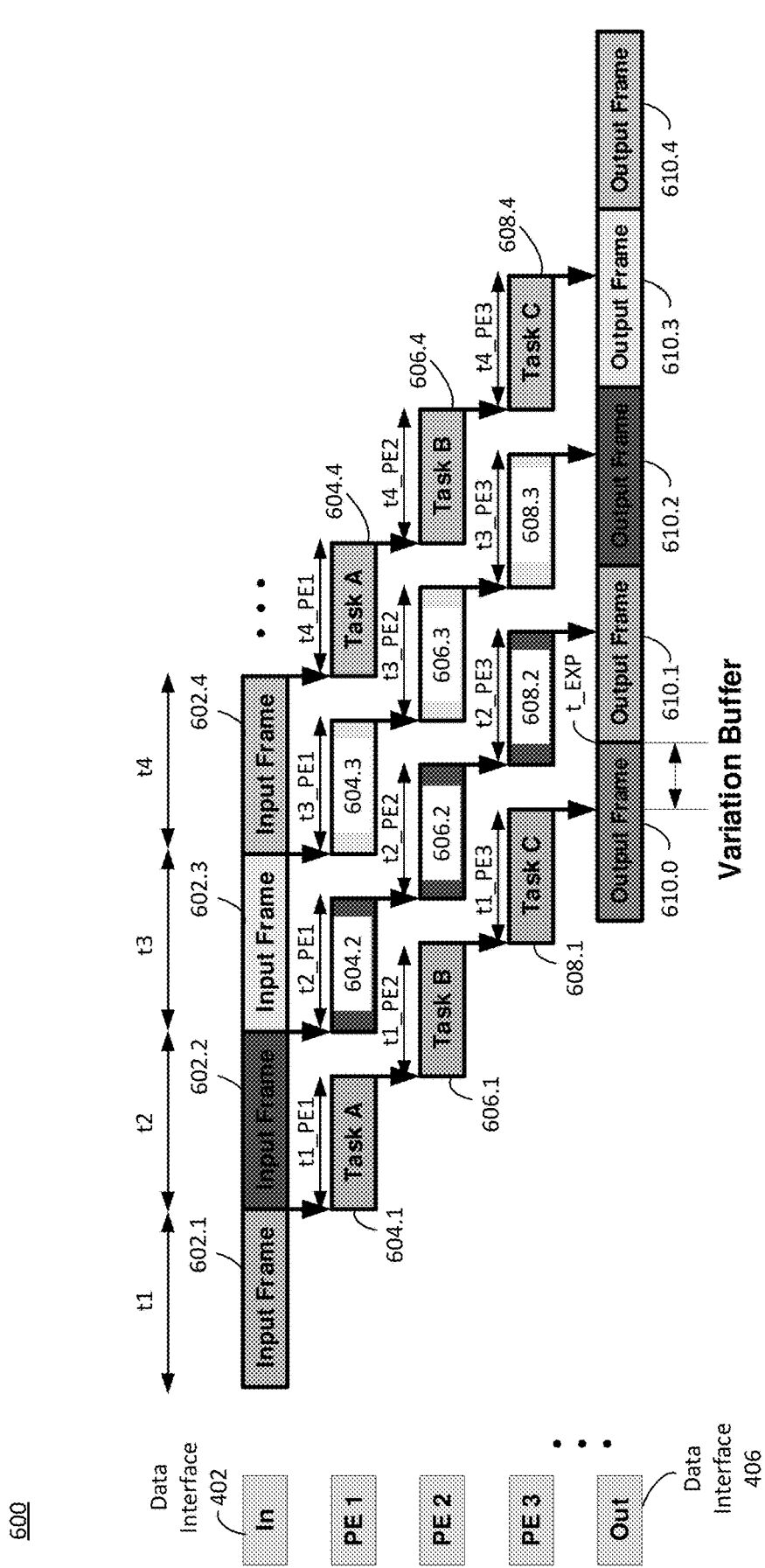
FIG. 6A illustrates a timing diagram of a data-driven synchronization that is implemented by a hybrid architecture, in accordance with the disclosure.

FIG. 6A illustrates a timing diagram of a data-driven synchronization that is implemented by a hybrid architecture, in accordance with the disclosure. Again, data-driven synchronization is easier to maintain and saves the additional cost of the control HW. Moreover, for a data-driven approach, the timing of the synchronization events and the data movement is determined by the data flow and processing duration. As a result, the synchronization and data transfer points in time can change with radio configuration changes, e.g. TDD switching, to compensate for dynamic processing, as processing durations may be data dependent.

Again, each of the PEs of the processing array 404 is configured to execute processing operations on an array of input data samples in accordance with received instructions to generate an array of output data samples. Each of the PEs in the processing array 404 is self-synchronizing, which is facilitated via data-driven synchronization in which the availability of arrays of data samples to be processed triggers each PE to start performing processing operations in accordance with a queued set of instructions. In the example illustrated in FIG. 6A, three PEs are shown and labeled as PE 1, PE 2, and PE 3, with each of the three PEs sequentially executing respective processing operations upon a new array of data samples being available for processing, which may be made available via the data interface 402 or via a previous PE in the PE "chain" used to performed the sequential series of processing operations. However, this is for ease of explanation and is non-limiting, as the diagram as shown in FIG. 6A may be applicable for any suitable number of PEs of the processing array 404, each executing respective processing operations in accordance with a chain of any suitable number of PEs. Moreover, each of the PEs PE 1, PE 2, and PE 3 as shown in FIG. 6A may be identified with any of the PEs as shown and discussed herein with respect to the PEs PE00-PE(M−1)(N−1) as shown and discussed herein with reference to FIG. 5, which form part of the processing array 404.

The input data frames as shown in FIG. 6A represent arrays of data samples that are provided by the data interface 402, and may have any suitable bit length. Each of the input data frames as shown in FIG. 6A is identified with a duration of time t1, t2, t3, t4, etc., which may represent the duration of a data load time interval required for the data interface 402 to load the arrays of data samples into a suitable memory (not shown in the Figures for brevity) and/or a duration of time required by each respective PE to read the array of data samples prior to performing respective processing operations thereon. Thus, the data interface 402 sequentially receives and loads each input data frame representing an array of data samples over the data load time interval, and this array of data sample is then sequentially processed (i.e. subjected to processing operations) by the first PE 1 in this scenario that occurs over a processing time interval t1_PE1. The first PE 1 represents the first PE in the processing array 404 that receives instructions and, in response, performs data processing operations on the array of data samples received from the data interface 402 once the array of input data samples (i.e. the input data frame 602.1) is loaded. This process is repeated by the PE 1 after processing operations have been completed, as shown in FIG. 6A, such that the PE 1 sequentially performs processing operations on the input data frames 602.1, 602.2, 602.3, 602.4, etc., as these arrays of data samples are loaded by the data interface 402. Thus, in the context of the first PE 1, the array of input data samples represents the input data frames, i.e. the array of data samples provided by the data interface 402.

Again, the first PE 1 sequentially executes respective processing operations on each input frame, i.e. each array of input data samples 602.1-602.4. Each of these processing operations are performed over a processing time interval such that the PE 1 performs processing operations on the input data frame 602.1 over a duration of time t1 PE1 to generate the array of output data samples 604.1, performs processing operations on the input data frame 602.2 over a duration of time t2 PE1 to generate the array of output data samples 604.2, performs processing operations on the input data frame 602.3 over a duration of time t3 PE1 to generate the array of output data samples 604.3, performs processing operations on input data frame 602.4 over a duration of time t4 PE1 to generate the array of output data samples 604.4, and so on. Each of these processing operations are equivalent to the "Task A" as shown in FIG. 6A, which may be the same processing operations or different processing operations in accordance with the receives instructions, regardless of each task having the same reference letter 'A'. Thus, each task performed by each PE in the processing array may occur over a respective processing time interval, which may vary between PEs and tasks based upon the particular task (i.e. the set of processing operations) that are performed.

The second PE 2 represents the next PE in the processing array that receives instructions and, in response, performs data processing operations on the array of output data samples generated by the first PE 1. Thus, in the context of the second PE 2, the array of received input data samples represents the array of output data samples generated by the previous PE, i.e. the array of output data samples 604.1-604.4 generated by the PE 1 after performing the respective processing operations on the input data frames 602.1-602.4 received from the data interface 402.

The second PE 2 then sequentially executes the processing operations on each array of received input data samples, i.e. array of output data samples 604.1-604.4 generated by the PE 1. These processing operations are performed over a processing time interval such that the PE 2 performs processing operations on the array of output data samples 604.1 over a duration of time t1 PE2 to generate the array of output data samples 606.1, performs processing operations on the array of output data samples 604.2 over a duration of time t2 PE2 to generate the array of output data samples 606.2, performs processing operations on the array of output data samples 604.3 over a duration of time t3 PE2 to generate the array of output data samples 606.3, performs processing operations on the array of output data samples 604.4 over a duration of time t4 PE2 to generate the array of output data samples 606.4, and so on. Each of these processing operations are equivalent to the "Task B" as shown in FIG. 6A, which may be the same processing operations or different processing operations in accordance with the receives instructions, regardless of each task having the same reference letter 'B'.

The third PE 3 represents the next PE in the processing array that receives instructions and, in response, performs data processing operations on the array of output data samples generated by the second PE 2. Thus, in the context of the third PE 3, the array of received input data samples represents the array of output data samples generated by the previous PE, i.e. the array of output data samples 606.1-606.4 generated by the PE 2 after performing the respective processing operations on the array of data samples 604.1-604.4 received from the first PE 1.

The third PE 3 then sequentially executes the processing operations on each array of received input data samples, i.e. array of output data samples 606.1-606.4 generated by the PE 2. These processing operations are performed over a processing time interval such that the PE 3 performs processing operations on the array of output data samples 606.1 over a duration of time t1 PE3 to generate the array of output data samples 608.1, performs processing operations on the array of output data samples 606.2 over a duration of time t2 PE3 to generate the array of output data samples 608.2, performs processing operations on the array of output data samples 606.3 over a duration of time t3 PE3 to generate the array of output data samples 608.3, performs processing operations on the array of output data samples 606.4 over a duration of time t4 PE3 to generate the array of output data samples 608.4, and so on. Each of these processing operations are equivalent to the "Task C" as shown in FIG. 6A, which may be the same processing operations or different processing operations in accordance with the received instructions, regardless of each task having the same reference letter 'C'.

Again, for each of the PEs 1, 2, and 3 as shown in FIG. 6A, the respective processing time intervals are represented as t1 PEx, t2 PEx, t3 PEx, t4 PEx, etc., with 'x' representing that particular PE as shown in FIG. 6A. In each case, the respective processing time intervals are based upon respectively received instructions. That is, each instruction is correlated with a number of clock cycles, and thus each respective processing time interval is a function of the number and type of instructions, which again indicate how many processing operations are to be executed by each PE and the type of processing operations to be executed.

In this illustrative scenario, it is assumed that the third PE 3 is the last PE in the PE chain to perform processing operations, and that no further processing operations are to be performed via the processing array 404 for each of the input data frames 602.1-602.4. Thus, the array of output data samples 608.1-608.4 are then sequentially transferred to the hardware accelerator 408 as the output data frames 610.1-610.4, respectively. This may represent the data interface 406 sequentially transferring the array of output data samples 608.1-608.4 to the memory 407, as discussed above. Again, the hardware accelerator 408 is configured to execute a predetermined processing function on each one of the array of output data samples, i.e. the output data frames 610.1-610.4, which are the output data samples 608.1-608.4 sequentially received from the array of processing elements 404 and stored in a format for processing via the hardware accelerator 408 to then generate respective sets of processed data samples (not shown). These sequentially-generated sets of processed data samples may then be used in accordance with the particular application in which the hardware accelerator is implemented, such as to perform wireless data communications.

However, it is noted that the hardware accelerator 408 executes each predetermined processing function on a respective array of output data samples 608.1-608.4 in accordance with a predetermined timing synchronization schedule. In other words, the hardware accelerator 408 "expects" the output data samples 610.1 to be ready for processing at the time t_EXP as shown in FIG. 6. Thus, the data interface 406 is configured to sequentially transfer each one of an array of output data samples to the hardware accelerator 408 in accordance with the predetermined timing synchronization schedule. In this context, "transfer" may mean an active transmission of data samples to the hardware accelerator 408 or, alternatively, the hardware accelerator 408 retrieving the output data samples from the data interface 406, such as from the memory 407. In any event, this predetermined timing synchronization schedule thus indicates when the hardware accelerator 408 expects to receive and perform processing functions on any suitable number N of the arrays of output data samples 608.1-608.4 provided by the data interface 406. In this way, the predetermined timing schedule indicates a periodicity with respect to when the hardware accelerator 408 is to execute a predetermined processing function on each array of output data samples that is sequentially received from the PEs via the data interface 406.

Again, the PEs of the processing array 404 utilize data-driven synchronization to independently perform self-synchronization. That is, the PEs of the processing array 404 are configured to execute their respective processing operations immediately upon receiving data (excepting for timing tolerances) and/or immediately upon data being available to be processed, which again may be provided via the data interface 402. In this scenario, the PEs also immediately transmit their respective arrays of output data samples upon completing their processing operations. Thus, upon each respective array of input data samples being loaded or otherwise available, the execution of processing operations by each PE of the processing array 404 is triggered and, once the processing operations are completed, the transmission of the output data samples is also triggered. Although this data-driven synchronization process is beneficial as it allows the PEs to be independently synchronized from other components of the hybrid architecture 400, this results in the array of output data samples 608.1-608.4 being output prior to the time t_EXP. As a result, the size of the memory 407 needs to accommodate this "early" transmission of the array of output data samples 608.1-608.4 by storing at least a portion of the array of output data samples 608.1-608.4 in the memory 407 (as the output frames 610.1-610.4), which functions as a variation buffer as shown in FIG. 6A.

Figure 6B:
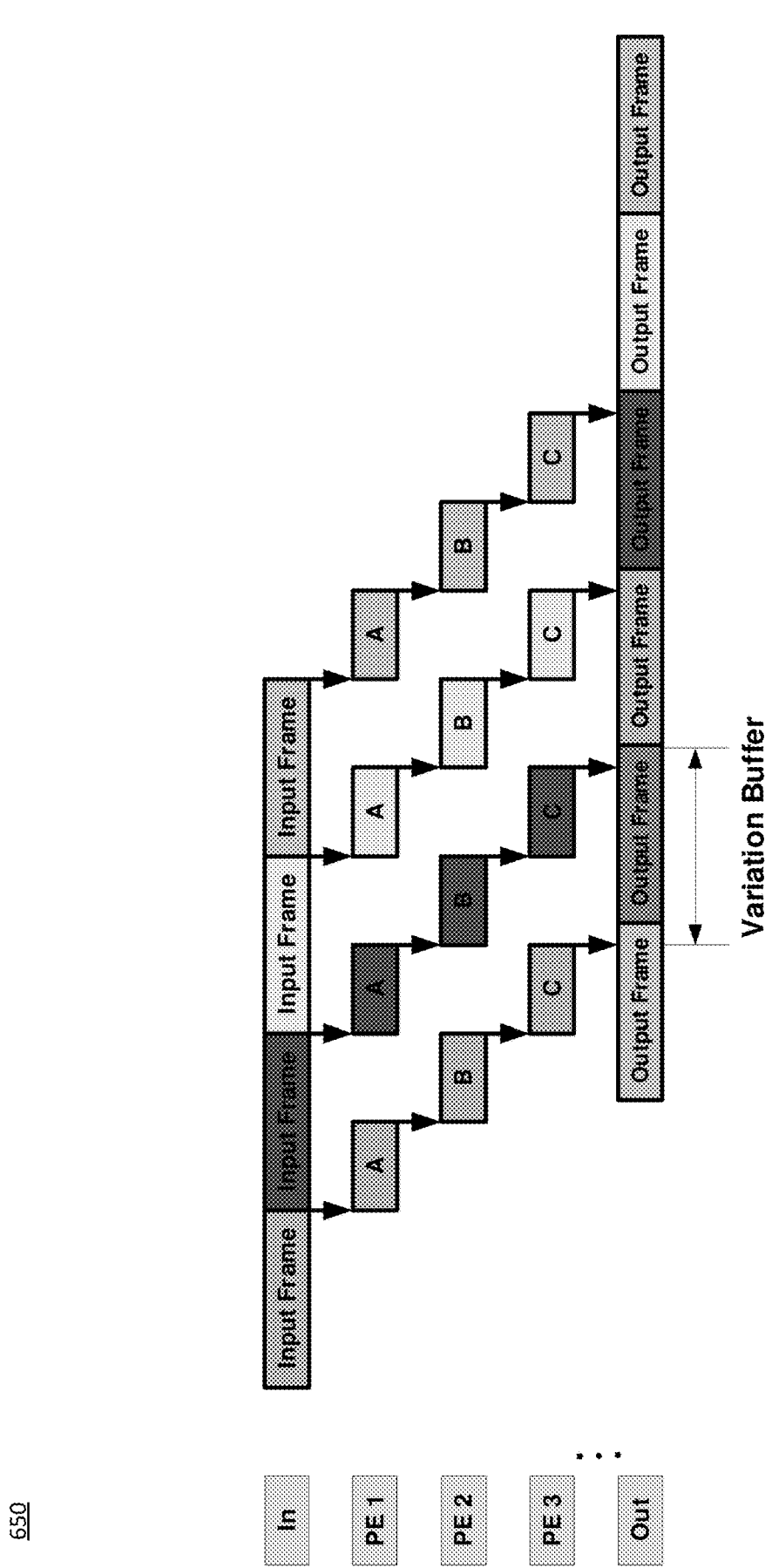
FIG. 6B illustrates a timing diagram of a data-driven synchronization that is implemented by a hybrid architecture having shorter task processing durations, in accordance with the disclosure.

This impact may be further exaggerated when the duration of the processing operations performed by the PEs are even shorter with respect to the duration of time required for each PE to complete processing operations. FIG. 6B illustrates such a scenario, which is identical to the scenario as shown in FIG. 6A with the exception of the duration of the processing operations performed by the PEs being shorter in the scenario shown in FIG. 6B versus that shown in FIG. 6A. Thus, for ease of explanation the timing diagram as shown in FIG. 6B is not labeled. However, as the duration of the processing operations performed by the PEs is further decreased, it is shown that the output data samples are available even earlier than the time expected by the hardware accelerator 408 in accordance with the predetermined timing schedule as noted above. As a result, the size of the memory 407 needs to be even further increased to accommodate for these timing differences. Because the memory 407 may form part of a scaled solution within the hybrid architecture 400, i.e. multiple memories may be implemented depending upon the number of ports, the increase in memory size, and thus cost, may be increased in accordance with such data-driven synchronization solutions. Furthermore, the delivery of the arrays of data samples prior to the expected time period of the hardware accelerator 408 may also contribute to a larger end-to-end latency.

Data Driven Synchronization with Added Latency

Figure 7A:
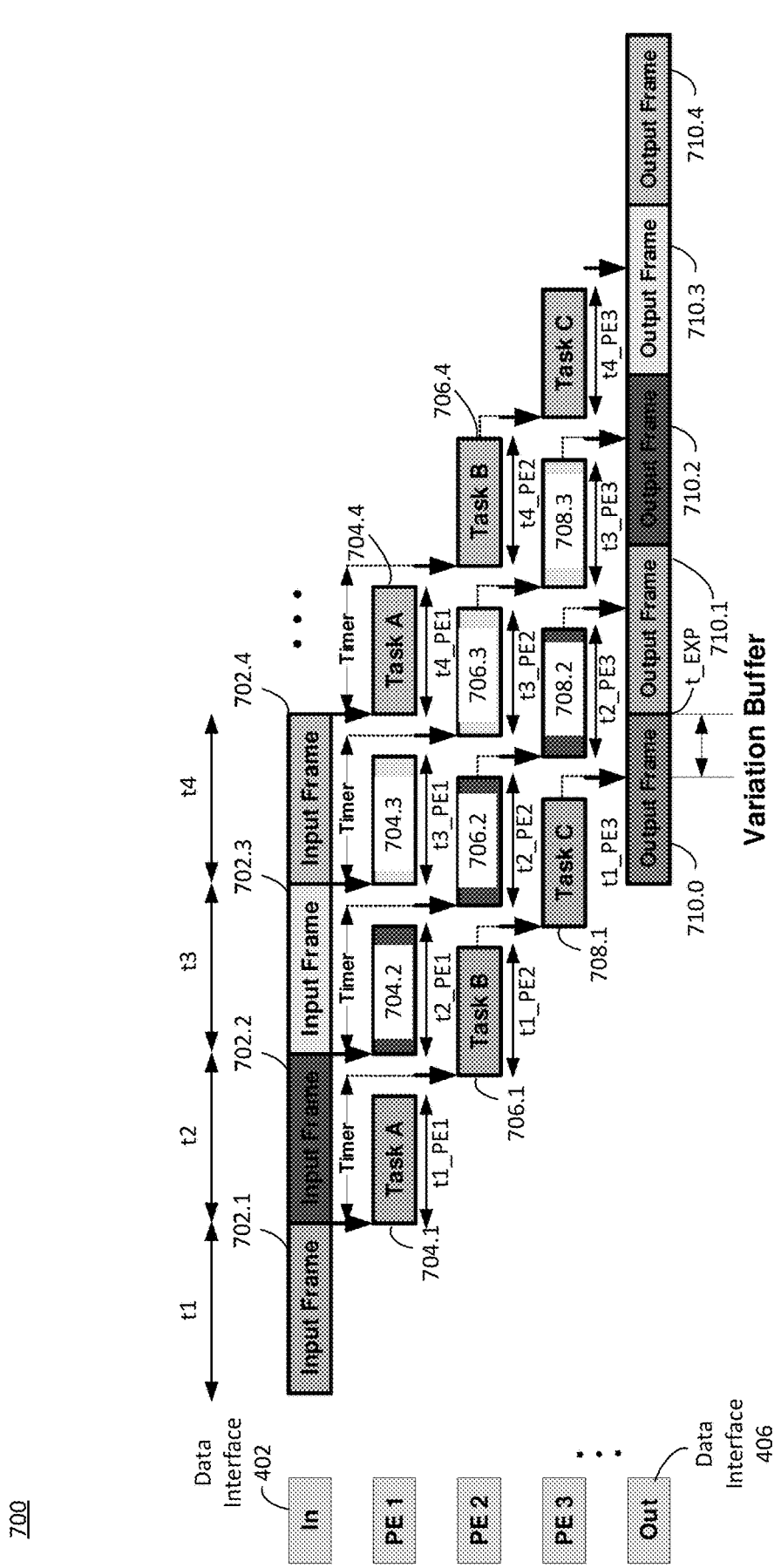
FIG. 7A illustrates a timing diagram of a data-driven synchronization that is implemented by a hybrid architecture using multiple timers, in accordance with the disclosure.
Figure 7B:
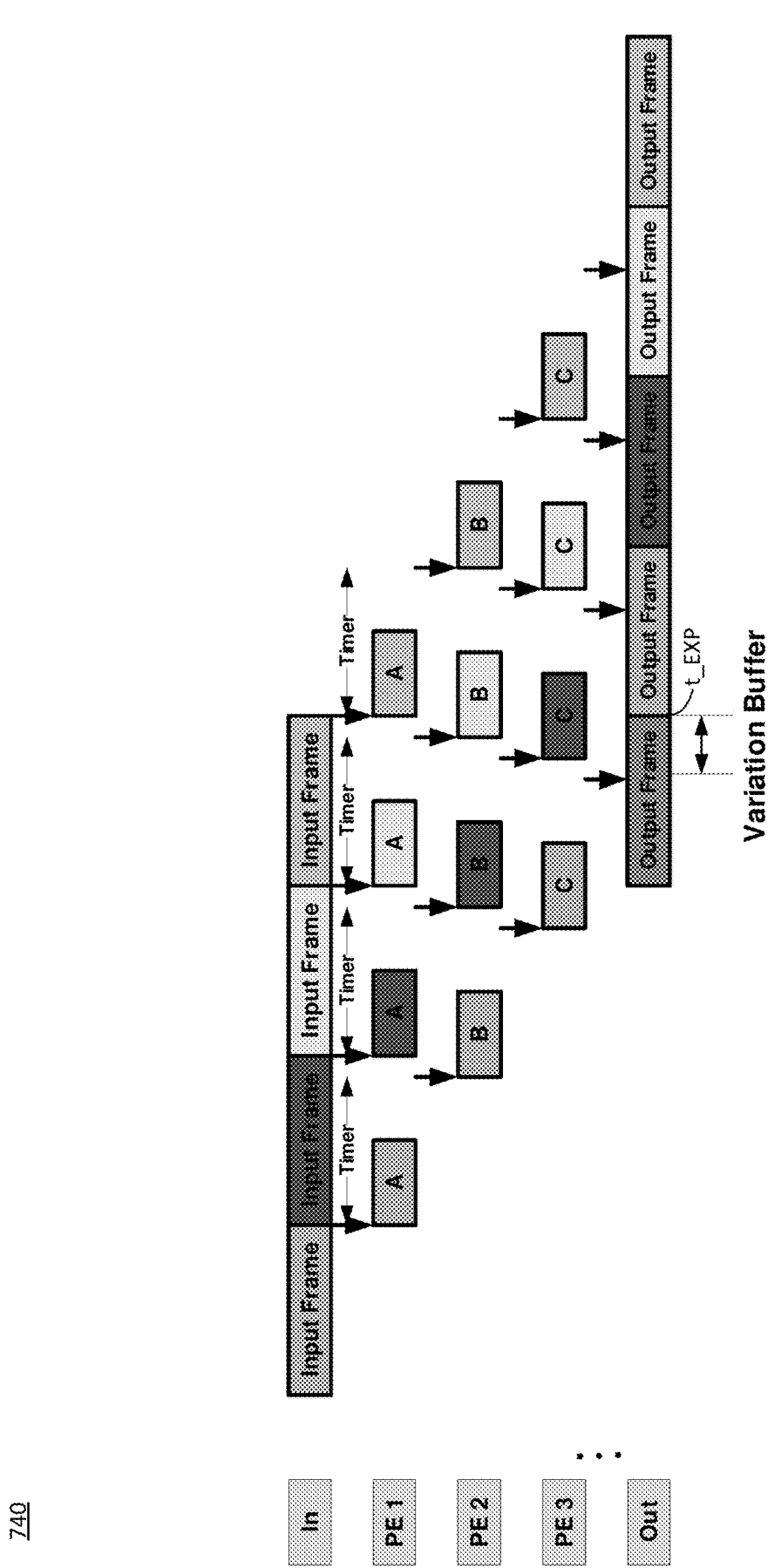
FIG. 7B illustrates a timing diagram of a data-driven synchronization that is implemented by a hybrid architecture using multiple timers and having shorter task processing durations, in accordance with the disclosure.
Figure 7C:
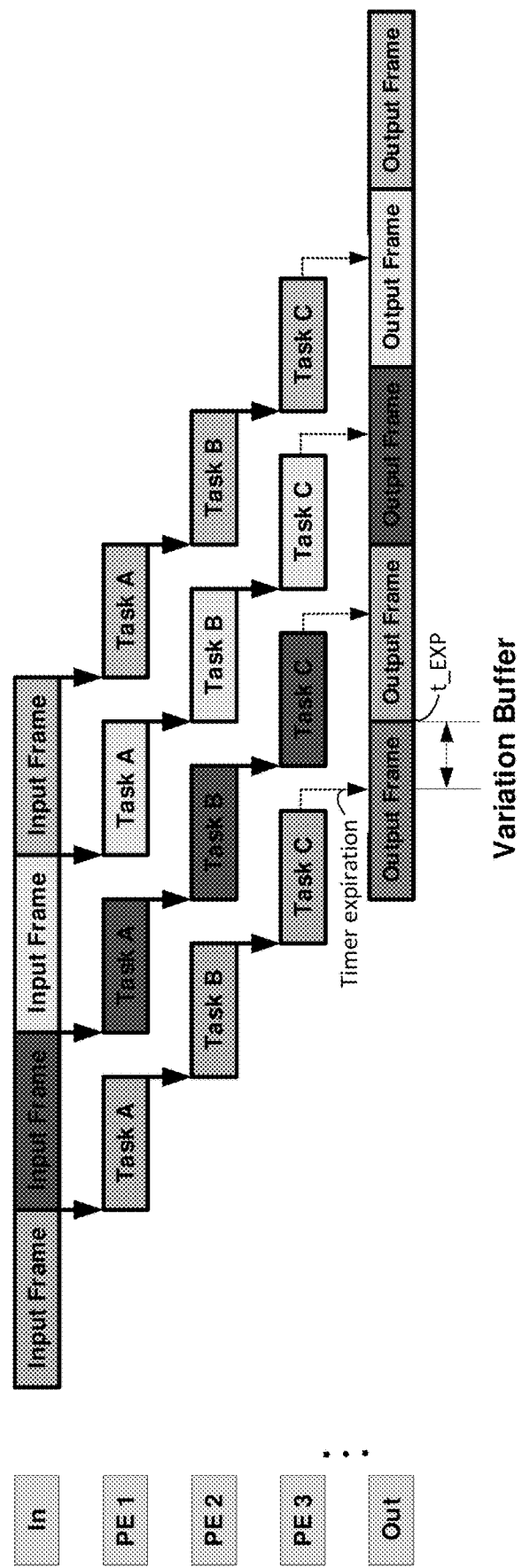
FIG. 7C illustrates a timing diagram of a data-driven synchronization that is implemented by a hybrid architecture using a single timer, in accordance with the disclosure.

To address the issues noted above with respect to the data-driven synchronization of the PEs, the solutions discussed with respect to FIGS. 7A-7C introduce the use of added latency to delay the transmission of the arrays of output data samples via one or more PEs. FIG. 7A illustrates a timing diagram of a data-driven synchronization that is implemented by a hybrid architecture using multiple timers, in accordance with the disclosure. The timing diagram as shown in FIG. 7A illustrates the same flow of processing operations performed via the data interface 402, the PEs of the processing array 404, and the data interface 406 as discussed above with reference to FIGS. 6A and 6B. Therefore, only the differences between these timing diagrams is provided without repeating the common elements of operation for purposes of brevity.

That is, and with continued reference to FIG. 7A, the data interface 402 sequentially provides arrays of data samples (i.e. input data frames) 702.1-702.4, which are processed by any suitable number of PEs, with three being used in this non-illustrative scenario as was described above with respect to the FIGS. 6A and 6B. Each of the PEs are configured in accordance with data-driven synchronization as explained above with respect to FIGS. 6A and 6B. That is, upon receiving each respective array of input data samples from either the data interface 402 or another PE, as the case may be, the execution of processing operations by each PE of the processing array 404 is triggered. Each PE then performs processing operations on the respectively received array of input data samples 702, 704, 706, etc., in accordance with respectively received instructions. Again, these processing operations occur over a duration of time t1 PEx, t2 PEx, t3 PEx, t4 PEx, etc., with 'x' representing that particular PE as shown in FIG. 7A.

However, unlike the PEs of the timing diagram as shown in FIGS. 6A and 6B, the PEs as shown in FIG. 7A are configured to wait to transmit their respective array of output data samples to the next PE or to the data interface 406, as the case may be. In other words, each of the PEs of the processing array 404 is configured to have a data-driven synchronization with respect to their input data, but a time-based synchronization with respect to their output data. The time delay that is used to trigger the transmission of the array of output data samples via each of the PEs may be achieved using various techniques.

As one illustrative scenario, one or more timers may be implemented. In some scenarios, each PE implements a respective timer as shown in FIG. 5, in which the timer 502.1 is shown for the PE00. In other scenarios, a single timer may be implemented by one or more of the PEs in each PE grouping. Thus, and to provide a non-limiting illustrative scenario, the PE00 as shown in FIG. 5 may be the only PE from among the PEs PE00, PE01, PE10, and PE11 that implements a timer or, alternatively, each one of the PEs in the processing array 404 (or a smaller subset thereof) may implement respective timers 502. In accordance with such scenarios, each PE is configured to determine the expiration of a predetermined time period based upon its respective local timer.

To provide yet another illustrative scenario, one or more of the PEs of the processing array 404 may be configured to receive a timer signal from a timer 506 that is external to the PEs, external to the hybrid architecture 400, etc. In accordance with such a scenario, each PE is configured to receive a timer signal that identifies the expiration of the predetermined time period based upon the external timer(s). The connections between the external timer(s) and the PEs may be in accordance with any suitable number and/or type of connections, with the non-limiting illustrative scenario as shown in FIG. 5 showing the timer 506 providing such a timer signal to the PEs via the data interface 406. The PEs may thus receive the timer signal in accordance with any suitable number and/or type of interconnections, wires, buses, etc.

In any event, each PE of the processing array 404 is configured to wait until the expiration of the predetermined time period to transmit its respective array of output data samples. Moreover, and regardless of whether local or external timer(s) are implemented, such timers be implemented as any suitable type of circuitry, hardware, and/or software components configured to generate one or more signals or otherwise indicate the expiration of the predetermined time period to the PEs.

Again, it is noted that the hybrid architecture 400 and/or the SoC of which the hybrid architecture 400 forms a part operates at a common frequency that is associated with the global clock as shown in FIG. 4. This global clock may be referenced to generate instructions and ensure that the system timing requirements are maintained by the various components of the hybrid architecture 400, and which may be referenced to an overall system of which the hybrid architecture 400 forms a part. This clock may be driven at any suitable frequency depending upon the particular application, timing requirements, application, etc. As one illustrative and non-limiting scenario, the global clock may have a frequency of 983 MHz. The hardware accelerator 408 is configured to execute the predetermined processing functions using the global clock. Thus, the use of the global clock may be particularly useful as a basis of the timers to provide the predetermined time period. As one illustrative and non-limiting scenario, the timer may be implemented as a counter that is configured to count up to a predetermined number of clock cycles associated with the global clock signal. The number of clock cycles may thus be selected to provide any suitable predetermined time period based upon the frequency of the global clock signal.

As another illustrative example, one or more PEs of the processing array 404 may implement processing circuitry 504 as shown in FIG. 5 with respect to the PE00. This processing circuitry enables each PE to identify when data is available for processing operations as part of the data-driven synchronization process, as well as to receive instructions regarding the specific processing operations and to perform the processing operations on the received arrays of input data samples. Thus, the processor circuitry 504.1 may additionally or alternatively enable each respective PE of the processing array 404 to handle the timer events upon detection of the expiration of the predetermined time period, which again may be via a local timer or a timer signal received form an external timer. This may be implemented in one scenario using basic processor timing instructions, and may additionally or alternatively include the use of a very long instruction word (VLIW) issue slot to increase the number of options and performance.

The predetermined time period begins or restarts at the same time each PE begins processing operations, and thus an external timer when used may be provided with data regarding when processing operations have started. In any event, each PE is configured to delay the transmission of its array of output data samples after the processing operations have been completed until the expiration of the predetermined time period. This may be facilitated via specific instructions provided to each PE as part of the processing instructions. In one illustrative and non-limiting scenario, this may include the use of a sleep(time) instruction, which causes the PE to go into a sleep mode upon completion of the processing operations, and to then awaken and continue afterwards thereby transmitting the array of output data samples.

As another illustrative and non-limiting scenario, this may include the use of a start(timer), poll(timer) instruction set. This causes a respective PE to start a timer upon receiving, accessing, and/or starting processing operations on an array of input data samples. Once the processing operations are completed, the PE then runs in a loop waiting for the timer to expire.

As yet another illustrative and non-limiting scenario, this may include the use of an exception(function,time) instruction set. This instruction causes a PE to execute a specific function when a predetermined time period has elapsed, which may be the transmission of the array of output data samples to the next PE or to the data interface 406, as the case may be.

Advantageously, the predetermined time period may be the same for each PE in the processing array 404. In one illustrative and non-limiting scenario, each PE in the processing array 404 may reference and/or use the same predetermined time period, which may be a static and unchanging time period regardless of the duration of the processing time intervals t1 PEx, t2_PEx, t3_PEx, t4_PEx, etc. Thus, the duration of the predetermined time period may be selected based upon a priori and/or operational knowledge of the system in which the hybrid architecture 400 is implemented.

In particular, it is noted that the predetermined time period may be specified so as to meet operating conditions of the hybrid architecture 400. That is, the predetermined time period may be selected to be longer than the longest processing time interval required by any of the PEs in the array 404 to complete their respective processing operations. This may be determined, in one illustrative scenario, based upon a maximum processing time interval t1 PEx, t2_PEx, t3_PEx, t4_PEx, etc. that is required by a PE to perform a number of processing operations in response to receiving a respective set of instructions. In other words, the performance of each PE in the processing array 404 may be known with respect to the size of the array of input data samples and the combination of processing operations that results in the maximum processing time interval to process an array of input data samples of that size. From this information, the predetermined time period may be selected.

Moreover, the predetermined time period may be selected to be less than the duration of time t1, t2, t3, t4, etc. Again, these durations of time represent the time required for the data interface 402 to load the arrays of data samples into a suitable memory and/or the time required by each respective PE to read the array of data samples prior to performing respective processing operations thereon. Thus, the predetermined time period may be selected having any suitable time value that is both longer than the longest processing time interval required by any of the PEs in the array 404 and shorter than the duration of time required for the data interface 402 to read in and load the arrays of input data samples.

In any event, because each PE delays its transmission of arrays of output data samples until the expiration of the predetermined time period as shown in FIG. 7A, the array of output data samples generated by the last PE are provided at a time that is closer to the time t_EXP when the hardware accelerator expects to process the array of data output samples in accordance with the predetermined timing schedule as noted above. As a result, the size of the buffer implemented by the data interface 406, such as the memory 407, may be reduced compared to an entirely data-driven synchronization system such as the one represented by the timing diagrams of FIGS. 6A and 6B. This is a result of a lesser number of data samples that need to be stored prior to the hardware accelerator 408 accessing them to perform predetermined processing functions.

FIG. 7B illustrates a timing diagram of a data-driven synchronization that is implemented by a hybrid architecture using multiple timers and having shorter task processing durations, in accordance with the disclosure. The timing diagram of FIG. 7B illustrates the same flow of processing operations performed via the data interface 402, the PEs of the processing array 404, and the data interface 406 as discussed above with reference to FIG. 7A. Therefore, only the differences between these timing diagrams is provided without repeating the common elements of operation for purposes of brevity.

That is, and with continued reference to FIG. 7B, the data interface 402 sequentially provides arrays of data samples (i.e. input data frames) 702.1-702.4, which are processed by any suitable number of PEs, with three being used in this non-illustrative scenario as was described above with respect to the FIG. 7A. Each of the PEs are configured in accordance with data-driven synchronization with respect to the data input and a time-based synchronization with respect to the data output as explained above with reference to FIG. 7A. However, the respective processing time intervals as shown in FIG. 7B for each of the PEs 1, 2, and 3 are shorter than the analogous processing time intervals t1_PEx, t2_PEx, t3_PEx, t4_PEx, etc., with 'x' representing that particular PE as shown in FIG. 7A.

For illustrative purposes, the processing time intervals as shown in FIG. 7B are assumed to be the same as the processing time intervals as shown in FIG. 6B. But because the predetermined time period used to delay the transmission of the array of output data samples by each PE is the same irrespective of these processing time intervals, each PE still transmits its respective array of output data samples at the same time as discussed above with respect to FIG. 7A. As a result, the size of the buffer implemented by the data interface 406, such as the memory 407, may be significantly reduced compared to the entirely data-driven synchronization system represented by the timing diagram of FIG. 6B. Moreover, in accordance with such implementations, each PE may comprise or otherwise reference a timer independently to deliver data at a specific moment, which may be in one illustrative scenario the longest processing time to perform the task.

FIG. 7C illustrates a timing diagram of a data-driven synchronization that is implemented by a hybrid architecture using a single timer, in accordance with the disclosure. The timing diagram of FIG. 7C illustrates the same flow of processing operations performed via the data interface 402, the PEs of the processing array 404, and the data interface 406 as discussed above with reference to FIGS. 7A and 7B. Therefore, only the differences between these timing diagrams is provided without repeating the common elements of operation for purposes of brevity.

That is, and with continued reference to FIG. 7C, the data interface 402 sequentially provides arrays of data samples (i.e. data frames) 702.1-702.4, which are processed by any suitable number of PEs, with three being used in this non-illustrative scenario as was described above with respect to the FIGS. 7A and 7B. The timing diagram as shown in FIG. 7C represents a hybrid implementation of both data-driven and time-based synchronization among the PEs of the processing array 404. In the illustrative and non-limiting scenario as shown in FIG. 7C, each of the PEs are configured in accordance with data-driven synchronization with respect to the data input. Furthermore, and in contrast to the PEs as shown in the timing diagrams of FIGS. 7A and 7B, PE 1 and PE 2 are configured to transmit their respective arrays of output data samples immediately upon being processed (excepting for timing tolerances), and thus are not configured in accordance with time-based synchronization at their outputs but rather configured in accordance with a data-driven synchronization such as that discussed with respect to the PEs of FIGS. 6A and 6B.

However, the last PE 3 as shown in FIG. 7C is configured to operate in accordance with a time-based synchronization, i.e. to delay the transmission of the array of output data samples as was the case for each of the PEs in FIGS. 7A and 7B. The end result is that the size of the buffer implemented by the data interface 406 is still reduced as was the case of the timing diagrams as shown in FIGS. 7A and 7B. But because only the last PE in the chain of PEs provides a delayed transition of its array of output samples, only this PE requires a local or external timer for operation, and only the instruction sets sent to such PEs need to provide specific timer-based instructions as noted above.

In other words, in the illustrative scenario identified with the timing diagram of FIG. 7C, the hybrid architecture 400 is configured such that the processing array 404 comprises different subsets of PEs, with one subset (such as the PEs 1 and 2 as shown in FIG. 7C) utilizing data-driven synchronization with respect to performing processing operations as soon as an array of input data samples are available and/or received, and transmitting a respective array of output data samples as soon as the processing operations have been completed. Another subset (such as the PE 3 as shown in FIG. 7C) are also data-synchronized with respect to performing processing operations as soon as an array of input data samples are available and/or received, but use time-based synchronization with respect to their outputs by delaying transmitting their respective array of output data samples until the predetermined time period has elapsed. It is noted that although FIG. 7C illustrates the last PE 3 implementing the time-based synchronization via the use of the timer as discussed herein, this is a non-limiting and illustrative scenario. In various implementations, any subset of the PEs of the processing array 400 may implement data-driven synchronization, whereas other PEs may implement time-based synchronization. Thus, PE 1, PE 2, and/or PE 3 may utilize time-based synchronization by referencing an internal or external timer, whereas PE 1, PE 2, and/or PE 3 may alternatively implement data-driven synchronization and need not utilize a timer.

Such a flexibility in the architecture may provide a cost savings in that the overall number of timers is reduced, although this advantage may be weighed against the complexity introduced by the instruction sets routing arrays of data samples to PEs within the processing array 404 to ensure that the PEs providing the last array of output samples to the data interface 406 use the time-delayed data transmission techniques discussed herein.

Figure 8:
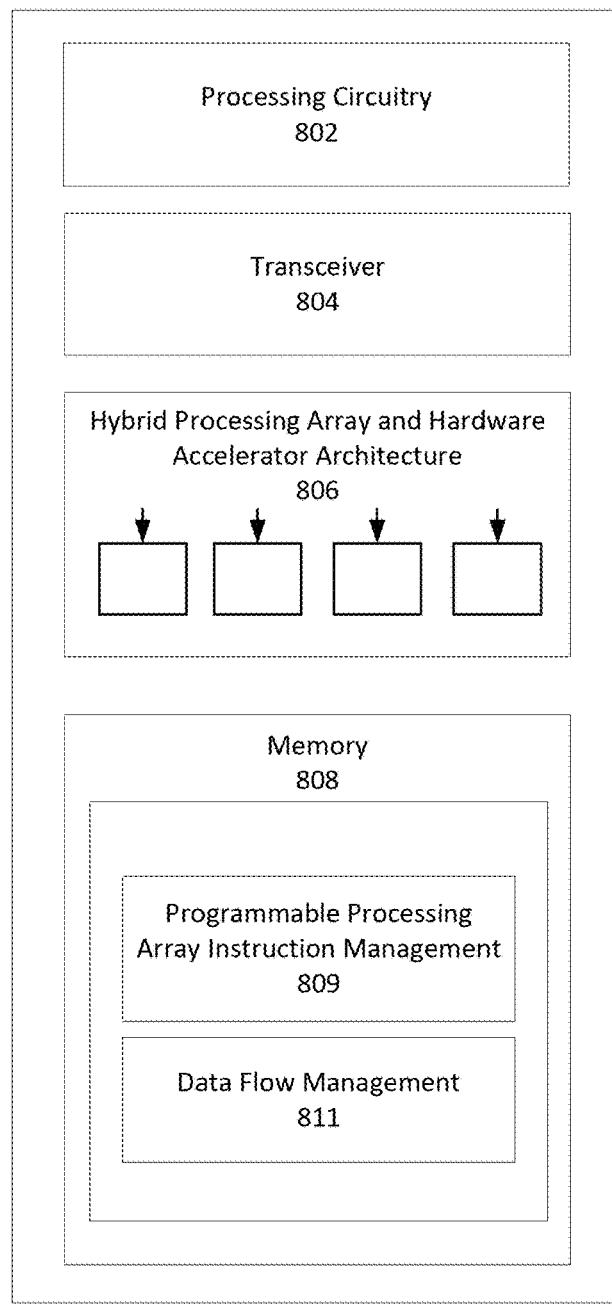
FIG. 8 illustrates a device, in accordance with the disclosure.

FIG. 8 illustrates a device, in accordance with the disclosure. The device 800 may be identified with one or more devices implementing a hybrid architecture, such as the hybrid architecture 400 as shown and discussed herein with reference to FIG. 4. The device 800 may be identified with a wireless device, a user equipment (UE) or other suitable device configured to perform wireless communications such as a mobile phone, a laptop computer, a wireless communications base station, a tablet, etc., and which may include one or more components configured to transmit and receive radio signals and to use processing operations as discussed herein to perform digital signal processing operations in accordance with wirelessly transmitted and/or received data, which may include DFE-based functions. Alternatively, the device 800 may be identified with a graphics processing unit (GPU), which may perform graphic processing on streams of graphical data.

As further discussed below, the device 800 may perform the functions as discussed herein with respect to the hybrid architecture 400 as shown and discussed with respect to FIG. 4. To do so, the device 800 may include processing circuitry 802, a transceiver 804, a hybrid processing array and hardware accelerator architecture 806, and a memory 808. The components shown in FIG. 8 are provided for ease of explanation, and the device 800 may implement additional, less, or alternative components as those shown in FIG. 8. In one scenario, the transceiver 804 may be omitted when not necessary for a particular application.

The processing circuitry 802 may be configured as any suitable number and/or type of processing circuitry and/or computer processors, which may function to control the device 800 and/or other components of the device 800. The processing circuitry 802 may be identified with one or more processors (or suitable portions thereof) implemented by the device 800 or a host system that implements the hybrid processing array and hardware accelerator architecture 806. The processing circuitry 802 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, the processing circuitry 802 may be configured to carry out instructions to perform arithmetical, logical, and/or input/output (I/O) operations, and/or to control the operation of one or more components of device 800 to perform various functions as described herein. The processing circuitry 802 may include one or more microprocessor cores, memory registers, buffers, clocks, etc., and may generate electronic control signals associated with the components of the device 800 to control and/or modify the operation of these components. The processing circuitry 802 may communicate with and/or control functions associated with the transceiver 804, the hybrid processing array and hardware accelerator architecture 806, and/or the memory 808.

The transceiver 804 (when present) may be implemented as any suitable number and/or type of components configured to transmit and/or receive data (such as data packets) and/or wireless signals in accordance with any suitable number and/or type of communication protocols. The transceiver 804 may include any suitable type of components to facilitate this functionality, including components associated with known transceiver, transmitter, and/or receiver operation, configurations, and implementations. Although depicted in FIG. 8 as a transceiver, the transceiver 804 may include any suitable number of transmitters, receivers, or combinations of these that may be integrated into a single transceiver or as multiple transceivers or transceiver modules. The transceiver 804 may include components typically identified with an RF front end and include antennas, ports, power amplifiers (PAs), RF filters, mixers, local oscillators (LOs), low noise amplifiers (LNAs), upconverters, downconverters, channel tuners, etc. Thus, the transceiver 8804 may be configured as any suitable number and/or type of components configured to facilitate receiving and/or transmitting data and/or signals in accordance with one or more communication protocols.

The transceiver 804 may be implemented as any suitable number and/or type of components to support wireless communications, and may be identified with the components of a DFE a shown and discussed herein with reference to FIG. 5. This may include analog-to-digital converters (ADCs), digital to analog converters (DACs), intermediate frequency (IF) amplifiers and/or filters, modulators, demodulators, baseband processors, one or more sample interfaces, one or more components otherwise known to be identified with RF front ends and/or DFEs, etc. The data received via the transceiver 804 (e.g. wireless signal data streams), data provided to the transceiver 804 for transmission (e.g. data streams for transmission), and/or data used in conjunction with the transmission and/or reception of data via the transceiver 804 (digital filter coefficients, DPD terms, etc.) may be processed as data streams via the hybrid processing array and hardware accelerator architecture 806, as discussed herein. Thus, the hybrid processing array and hardware accelerator architecture 806 may be identified with the hybrid architecture 400 as shown and described herein with reference to FIG. 4.

The memory 808 stores data and/or instructions such that, when the instructions are executed by the processing circuitry 802, cause the device 800 to perform various functions as described herein with respect to the hybrid processing array and hardware accelerator architecture 806, such as controlling, monitoring, and/or regulating the flow of data through the hybrid processing array and hardware accelerator architecture 806. The memory 808 may be implemented as any well-known volatile and/or non-volatile memory, including read-only memory (ROM), random access memory (RAM), flash memory, a magnetic storage media, an optical disc, erasable programmable read only memory (EPROM), programmable read only memory (PROM), etc. The memory 708 may be non-removable, removable, or a combination of both. The memory 808 may be implemented as a non-transitory computer readable medium storing one or more executable instructions such as, for example, logic, algorithms, code, etc.

As further discussed below, the instructions, logic, code, etc., stored in the memory 808 are represented by the various modules as shown, which may enable the functionality disclosed herein to be functionally realized. Alternatively, the modules as shown in FIG. 8 that are associated with the memory 808 may include instructions and/or code to facilitate control and/or monitor the operation of hardware components implemented via the device 800. In other words, the modules shown in FIG. 8 are provided for ease of explanation regarding the functional association between hardware and software components. Thus, the processing circuitry 802 may execute the instructions stored in these respective modules in conjunction with one or more hardware components to perform the various functions as discussed herein.

The executable instructions stored in the programmable processing array instruction management module 809 may facilitate, in conjunction with execution via the processing circuitry 802, the device 800 receiving and decoding processor instructions (which may be sent via the processing circuitry 802 or other suitable component of the device 800 or a component external to the device 800), and providing arrays of data samples to the PEs within the processing array portion of the hybrid processing array and hardware accelerator architecture 806 (such as via the data interface 402 as discussed herein). Additionally or alternatively, the executable instructions stored in the programmable processing array instruction management module 809 may facilitate, in conjunction with execution via the processing circuitry 802, the device 800 providing the time-based instructions to the PEs to facilitate the delay of the transmission of the array of output data samples, as discussed herein. The functionality provided by the programmable processing array instruction management module 809 is a function of the particular implementation and/or type of processing array implemented via the device 800.

Thus, if a vector processor is implemented, then the programmable processing array instruction management module 809 may facilitate the determination of each specific vector processor instruction to perform specific types of vector processing operations and/or any of the functionality with respect to a vector processor architecture such as the retrieval of vector data samples from vector registers, performing vector processing operations and/or computations, providing the results of vector processing operations to the hardware accelerator portion of the hybrid processing array and hardware accelerator architecture 806, etc. Of course, in the event that the device 800 implements an FPGA, DSP, or other suitable type of processing array architecture, then the programmable processing array instruction management module 809 may function to translate and/or decode instructions to identify the type of processing operations and/or calculations to perform on arrays of data samples in an analogous manner as the use of a vector processor.

The executable instructions stored in the data flow management module 811 may facilitate, in conjunction with execution via the processing circuitry 802, the routing of arrays of data samples within the hybrid processing array and hardware accelerator architecture 806. This may include routing arrays of data samples to the data interfaces 402, 406, converting arrays of data samples to a format recognized by the hardware accelerator 408, and vice-versa. Thus, the executable instructions stored in the data flow management module 811 may facilitate routing data samples from the data interface 402 to the processing array 404, to the data interface 406, to the hardware accelerator 408, to the DFE, etc., as shown and discussed herein with reference to FIGS. 4 and 5.

General Operation of a First SoC

A system on a chip (SoC) is provided. With reference to FIG. 4, the SoC includes an array of processing elements, each one of the array of processing elements being configured to execute processing operations on an array of input data samples in accordance with received instructions to generate an array of output data samples, and to delay transmission of the array of output data samples until expiration of a predetermined time period; and a hardware accelerator configured to execute a predetermined processing function on each one of an array of output data samples that is sequentially received from the array of processing elements in accordance with a predetermined timing synchronization schedule to sequentially generate respective sets of processed data samples. The sequentially-generated respective sets of processed data samples are used to perform wireless data communications. Furthermore, the expiration of the predetermined time period is based upon a counter configured to count up to a predetermined number of clock cycles associated with a clock signal, and the predetermined timing synchronization schedule is based upon the clock signal. In addition or in alternative to and in any combination with the optional features previously explained in this paragraph, each one of the array of processing elements is configured to receive a timer signal from a timer that is external to the array of processing elements that indicates the expiration of the predetermined time period. In addition or in alternative to and in any combination with the optional features previously explained in this paragraph, each one of the array of processing elements comprises a timer configured to indicate the expiration of the predetermined time period. In addition or in alternative to and in any combination with the optional features previously explained in this paragraph, the predetermined time period associated with the timer of each respective one of the array of processing elements is the same predetermined time period. In addition or in alternative to and in any combination with the optional features previously explained in this paragraph, the processing operations executed via each respective one of the array of processing elements are performed over a respective processing time interval based upon respectively received instructions, and the predetermined time period is longer than a longest one of the respective processing time intervals. In addition or in alternative to and in any combination with the optional features previously explained in this paragraph, each one of a subset of the array of processing elements is configured to execute processing operations on an array of input data samples received from a data interface to generate an array of output data samples, each one of the array of input data samples is stored in the data interface over a data load time interval, and the predetermined time period is shorter than the data load time interval. 8. In addition or in alternative to and in any combination with the optional features previously explained in this paragraph, the SoC further comprises a data interface coupled to the array of processing elements and to the hardware accelerator, the data interface being configured to sequentially transfer each one of an array of output data samples to the hardware accelerator in accordance with the predetermined timing synchronization schedule. In addition or in alternative to and in any combination with the optional features previously explained in this paragraph, the predetermined timing schedule indicates a periodicity with respect to when the hardware accelerator is to execute the predetermined processing function on each one of the array of output data samples that is sequentially received from the array of processing elements. In addition or in alternative to and in any combination with the optional features previously explained in this paragraph, each one of the array of processing elements is configured to utilize data-driven synchronization such that, upon receiving a respective array of input data samples, execution of processing operations on the respective array of input data samples is triggered.

General Operation of a Second SoC

A system on a chip (SoC) is provided. With reference to FIG. 4, the SoC includes an array of processing elements, comprising: a first subset of processing elements, each processing element from among the first subset of processing elements being configured to execute processing operations on an array of input data samples in accordance with received instructions and to generate and transmit an array of output data samples; a second subset of processing elements, each processing element from among the second subset of processing elements being configured to execute processing operations an array of input data samples in accordance with received instructions to generate an array of output data samples, and to delay transmission of the array of output data samples until expiration of a predetermined time period; and a hardware accelerator configured to execute a predetermined processing function on each one of an array of output data samples, which are sequentially received from the second subset of processing elements in accordance with a predetermined timing synchronization schedule to sequentially generate respective sets of processed data samples. The sequentially-generated respective sets of processed data samples are used to perform wireless data communications. Furthermore, the expiration of the predetermined time period is based upon a counter configured to count up to a predetermined number of clock cycles associated with a clock signal, and the predetermined timing synchronization schedule is based upon the clock signal. In addition or in alternative to and in any combination with the optional features previously explained in this paragraph, each one of the second subset of processing elements is configured to receive a timer signal from a timer that is external to the array of processing elements that indicates the expiration of the predetermined time period. In addition or in alternative to and in any combination with the optional features previously explained in this paragraph, each one of the second subset of processing elements comprises a timer configured to indicate the expiration of the predetermined time period. In addition or in alternative to and in any combination with the optional features previously explained in this paragraph, the predetermined time period associated with the timer of each respective one of the second subset of processing elements is the same predetermined time period. In addition or in alternative to and in any combination with the optional features previously explained in this paragraph, the processing operations executed via each respective one of the array of processing elements are performed over a respective processing time interval based upon respectively received instructions, and the predetermined time period is longer than a longest one of the respective processing time intervals. In addition or in alternative to and in any combination with the optional features previously explained in this paragraph, a first one of the first subset of processing elements is configured to execute processing operations on an array of input data samples received from a data interface to generate an array of output data samples, each one of the array of input data samples is stored in the data interface over a data load time interval, and the predetermined time period is shorter than the data load time interval. In addition or in alternative to and in any combination with the optional features previously explained in this paragraph, the SoC further comprises a data interface coupled to the second subset of processing elements and to the hardware accelerator, the data interface being configured to sequentially transfer each one of the array of output data samples to the hardware accelerator in accordance with the predetermined timing synchronization schedule. In addition or in alternative to and in any combination with the optional features previously explained in this paragraph, the predetermined timing schedule indicates a periodicity with respect to when the hardware accelerator is to execute the predetermined processing function on each one of the array of output data samples that is sequentially received from the second subset of processing elements. In addition or in alternative to and in any combination with the optional features previously explained in this paragraph, each one of the array of processing elements is configured to utilize data-driven synchronization such that, upon receiving a respective array of input data samples, execution of processing operations on the respective array of input data samples is triggered.

A Process Flow

Figure 9:
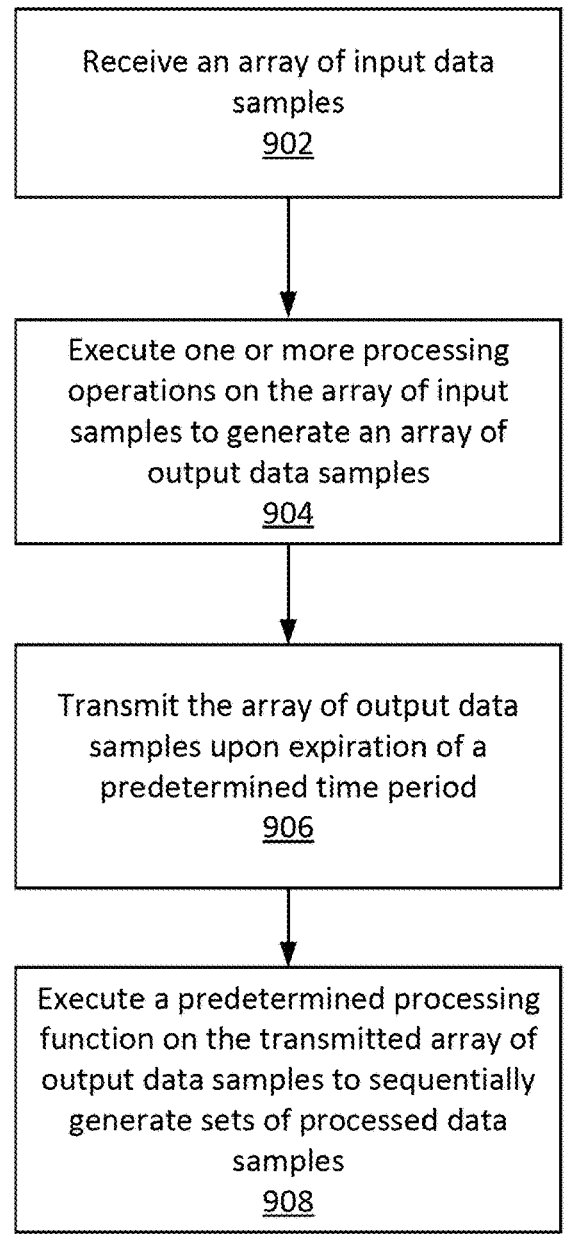
FIG. 9 illustrates a process flow, in accordance with the disclosure.

FIG. 9 illustrates a process flow. With reference to FIG. 9, the process flow 900 may be a computer-implemented method executed by and/or otherwise associated with one or more processors (processing circuitry) and/or storage devices. These processors and/or storage devices may be associated with one or more components of the hybrid architecture 400 as discussed herein and/or one or more components of the device 800 as discussed herein. The processors and/or storage devices may be identified with the one or more PEs of the processing array 404, processing circuitry identified with the hardware accelerator 408, and/or the processing circuitry 802. The flow 900 may include alternate or additional steps that are not shown in FIG. 9 for purposes of brevity, and may be performed in a different order than the steps shown in FIG. 9.

Flow 900 may begin when one or more processors receive (block 802) an array of input data samples. These data samples may be provided via the data interface 402 as discussed above with reference to FIGS. 4 and 5, and may include any suitable number of data samples as discussed herein.

Flow 900 may include one or more processors, in response to receiving the array of data samples, executing (block 904) one or more processing operations on the array of input data samples. These processing operations may be executed via the PEs of the processing array 404 as noted herein in accordance with specific instructions such as an instruction set. The processing operations may include reordering, reformatting, reorganizing, and/or modifying the array of data samples, as noted herein, such that the PE generates an array of output data samples upon executing the one or more processing operations.

Flow 900 may include one or more processors transmitting (block 906) the array of output data samples after the processing operations have been performed by a PE of the processing array 404 upon expiration of a predetermined time period. This may include the use of the data interface 406 to load the data samples into a memory, as noted above.

Flow 900 may include one or more processors executing (block 908) a predetermined processing function on the transmitted (and loaded) array of data output samples. This may include the hardware accelerator 408 executing one or more hardware-based computations on the array of output data samples as noted herein to sequentially generate respective sets of processed data samples (i.e. a set of processed data sample per array of output data samples processed in this way). Again, such processed data samples may then be used in accordance with any suitable application, such as to perform wireless data communications.

EXAMPLES

The following examples pertain to various techniques of the present disclosure.

An example (e.g. example 1) relates to system on a chip (SoC), comprising: an array of processing elements, each one of the array of processing elements being configured to execute processing operations on an array of input data samples in accordance with received instructions to generate an array of output data samples, and to delay transmission of the array of output data samples until expiration of a predetermined time period; and a hardware accelerator configured to execute a predetermined processing function on each one of an array of output data samples that is sequentially received from the array of processing elements in accordance with a predetermined timing synchronization schedule to sequentially generate respective sets of processed data samples, wherein the sequentially-generated respective sets of processed data samples are used to perform wireless data communications.

Another example (e.g. example 2) relates to a previously-described example (e.g. example 1), wherein the expiration of the predetermined time period is based upon a counter configured to count up to a predetermined number of clock cycles associated with a clock signal, and wherein the predetermined timing synchronization schedule is based upon the clock signal.

Another example (e.g. example 3) relates to a previously-described example (e.g. one or more of examples 1-2), wherein each one of the array of processing elements is configured to receive a timer signal from a timer that is external to the array of processing elements that indicates the expiration of the predetermined time period.

Another example (e.g. example 4) relates to a previously-described example (e.g. one or more of examples 1-3), wherein each one of the array of processing elements comprises a timer configured to indicate the expiration of the predetermined time period.

Another example (e.g. example 5) relates to a previously-described example (e.g. one or more of examples 1-4), wherein the predetermined time period associated with the timer of each respective one of the array of processing elements is the same predetermined time period.

Another example (e.g. example 6) relates to a previously-described example (e.g. one or more of examples 1-5), wherein the processing operations executed via each respective one of the array of processing elements are performed over a respective processing time interval based upon respectively received instructions, and wherein the predetermined time period is longer than a longest one of the respective processing time intervals.

Another example (e.g. example 7) relates to a previously-described example (e.g. one or more of examples 1-6), wherein: each one of a subset of the array of processing elements is configured to execute processing operations on an array of input data samples received from a data interface to generate an array of output data samples, each one of the array of input data samples is stored in the data interface over a data load time interval, and the predetermined time period is shorter than the data load time interval.

Another example (e.g. example 8) relates to a previously-described example (e.g. one or more of examples 1-7), further comprising: a data interface coupled to the array of processing elements and to the hardware accelerator, the data interface being configured to sequentially transfer each one of an array of output data samples to the hardware accelerator in accordance with the predetermined timing synchronization schedule.

Another example (e.g. example 9) relates to a previously-described example (e.g. one or more of examples 1-8), wherein the predetermined timing schedule indicates a periodicity with respect to when the hardware accelerator is to execute the predetermined processing function on each one of the array of output data samples that is sequentially received from the array of processing elements.

Another example (e.g. example 10) relates to a previously-described example (e.g. one or more of examples 1-9), wherein each one of the array of processing elements is configured to utilize data-driven synchronization such that, upon receiving a respective array of input data samples, execution of processing operations on the respective array of input data samples is triggered.

An example (e.g. example 11) relates to a system on a chip (SoC), comprising: an array of processing elements, comprising: a first subset of processing elements, each processing element from among the first subset of processing elements being configured to execute processing operations on an array of input data samples in accordance with received instructions and to generate and transmit an array of output data samples; a second subset of processing elements, each processing element from among the second subset of processing elements being configured to execute processing operations an array of input data samples in accordance with received instructions to generate an array of output data samples, and to delay transmission of the array of output data samples until expiration of a predetermined time period; and a hardware accelerator configured to execute a predetermined processing function on each one of an array of output data samples, which are sequentially received from the second subset of processing elements in accordance with a predetermined timing synchronization schedule to sequentially generate respective sets of processed data samples, wherein the sequentially-generated respective sets of processed data samples are used to perform wireless data communications.

Another example (e.g. example 12) relates to a previously-described example (e.g. example 11), wherein the expiration of the predetermined time period is based upon a counter configured to count up to a predetermined number of clock cycles associated with a clock signal, and wherein the predetermined timing synchronization schedule is based upon the clock signal.

Another example (e.g. example 13) relates to a previously-described example (e.g. one or more of examples 11-12), wherein each one of the second subset of processing elements is configured to receive a timer signal from a timer that is external to the array of processing elements that indicates the expiration of the predetermined time period.

Another example (e.g. example 14) relates to a previously-described example (e.g. one or more of examples 11-13), wherein each one of the second subset of processing elements comprises a timer configured to indicate the expiration of the predetermined time period.

Another example (e.g. example 15) relates to a previously-described example (e.g. one or more of examples 11-14), wherein the predetermined time period associated with the timer of each respective one of the second subset of processing elements is the same predetermined time period.

Another example (e.g. example 16) relates to a previously-described example (e.g. one or more of examples 11-15), wherein the processing operations executed via each respective one of the array of processing elements are performed over a respective processing time interval based upon respectively received instructions, and wherein the predetermined time period is longer than a longest one of the respective processing time intervals.

Another example (e.g. example 17) relates to a previously-described example (e.g. one or more of examples 11-16), wherein: a first one of the first subset of processing elements is configured to execute processing operations on an array of input data samples received from a data interface to generate an array of output data samples, each one of the array of input data samples is stored in the data interface over a data load time interval, and the predetermined time period is shorter than the data load time interval.

Another example (e.g. example 18) relates to a previously-described example (e.g. one or more of examples 11-17), further comprising: a data interface coupled to the second subset of processing elements and to the hardware accelerator, the data interface being configured to sequentially transfer each one of the array of output data samples to the hardware accelerator in accordance with the predetermined timing synchronization schedule.

Another example (e.g. example 19) relates to a previously-described example (e.g. one or more of examples 11-18), wherein the predetermined timing schedule indicates a periodicity with respect to when the hardware accelerator is to execute the predetermined processing function on each one of the array of output data samples that is sequentially received from the second subset of processing elements.

Another example (e.g. example 20) relates to a previously-described example (e.g. one or more of examples 11-19), wherein each one of the array of processing elements is configured to utilize data-driven synchronization such that, upon receiving a respective array of input data samples, execution of processing operations on the respective array of input data samples is triggered.

An example (e.g. example 21) relates to system on a chip (SoC), comprising: an array of processing means, each one of the array of processing means executing processing operations on an array of input data samples in accordance with received instructions to generate an array of output data samples, and delaying transmission of the array of output data samples until expiration of a predetermined time period; and a hardware accelerator means for executing a predetermined processing function on each one of an array of output data samples that is sequentially received from the array of processing elements in accordance with a predetermined timing synchronization schedule to sequentially generate respective sets of processed data samples, wherein the sequentially-generated respective sets of processed data samples are used to perform wireless data communications.

Another example (e.g. example 22) relates to a previously-described example (e.g. example 21), wherein the expiration of the predetermined time period is based upon a counter configured to count up to a predetermined number of clock cycles associated with a clock signal, and wherein the predetermined timing synchronization schedule is based upon the clock signal.

Another example (e.g. example 23) relates to a previously-described example (e.g. one or more of examples 21-22), wherein each one of the array of processing means receives a timer signal from a timer that is external to the array of processing elements that indicates the expiration of the predetermined time period.

Another example (e.g. example 24) relates to a previously-described example (e.g. one or more of examples 21-23), wherein each one of the array of processing means comprises a timer configured to indicate the expiration of the predetermined time period.

Another example (e.g. example 25) relates to a previously-described example (e.g. one or more of examples 21-24), wherein the predetermined time period associated with the timer of each respective one of the array of processing means is the same predetermined time period.

Another example (e.g. example 26) relates to a previously-described example (e.g. one or more of examples 21-25), wherein the processing operations executed via each respective one of the array of processing means are performed over a respective processing time interval based upon respectively received instructions, and wherein the predetermined time period is longer than a longest one of the respective processing time intervals.

Another example (e.g. example 27) relates to a previously-described example (e.g. one or more of examples 21-26), wherein: each one of a subset of the array of processing means executes processing operations on an array of input data samples received from a data interface to generate an array of output data samples, each one of the array of input data samples is stored in the data interface over a data load time interval, and the predetermined time period is shorter than the data load time interval.

Another example (e.g. example 28) relates to a previously-described example (e.g. one or more of examples 21-27), further comprising: a data interface means coupled to the array of processing elements and to the hardware accelerator, the data interface means sequentially transferring each one of an array of output data samples to the hardware accelerator means in accordance with the predetermined timing synchronization schedule.

Another example (e.g. example 29) relates to a previously-described example (e.g. one or more of examples 21-28), wherein the predetermined timing schedule indicates a periodicity with respect to when the hardware accelerator means is to execute the predetermined processing function on each one of the array of output data samples that is sequentially received from the array of processing means.

Another example (e.g. example 30) relates to a previously-described example (e.g. one or more of examples 21-29), wherein each one of the array of processing means utilizes data-driven synchronization such that, upon receiving a respective array of input data samples, execution of processing operations on the respective array of input data samples is triggered.

An example (e.g. example 31) relates to a system on a chip (SoC), comprising: an array of processing means, comprising: a first subset of processing means, each processing means from among the first subset of processing elements executing processing operations on an array of input data samples in accordance with received instructions and generating and transmitting an array of output data samples, a second subset of processing means, each processing means from among the second subset of processing means executing processing operations an array of input data samples in accordance with received instructions to generate an array of output data samples, and delaying transmission of the array of output data samples until expiration of a predetermined time period; and a hardware accelerator means for executing a predetermined processing function on each one of an array of output data samples, which are sequentially received from the second subset of processing means in accordance with a predetermined timing synchronization schedule to sequentially generate respective sets of processed data samples, wherein the sequentially-generated respective sets of processed data samples are used to perform wireless data communications.

Another example (e.g. example 32) relates to a previously-described example (e.g. example 31), wherein the expiration of the predetermined time period is based upon a counter configured to count up to a predetermined number of clock cycles associated with a clock signal, and wherein the predetermined timing synchronization schedule is based upon the clock signal.

Another example (e.g. example 33) relates to a previously-described example (e.g. one or more of examples 31-32), wherein each one of the second subset of processing means receives a timer signal from a timer that is external to the array of processing elements that indicates the expiration of the predetermined time period.

Another example (e.g. example 34) relates to a previously-described example (e.g. one or more of examples 31-33), wherein each one of the second subset of processing means comprises a timer configured to indicate the expiration of the predetermined time period.

Another example (e.g. example 35) relates to a previously-described example (e.g. one or more of examples 31-34), wherein the predetermined time period associated with the timer of each respective one of the second subset of processing means is the same predetermined time period.

Another example (e.g. example 36) relates to a previously-described example (e.g. one or more of examples 31-35), wherein the processing operations executed via each respective one of the array of processing means are performed over a respective processing time interval based upon respectively received instructions, and wherein the predetermined time period is longer than a longest one of the respective processing time intervals.

Another example (e.g. example 37) relates to a previously-described example (e.g. one or more of examples 31-36), wherein: a first one of the first subset of processing means executes processing operations on an array of input data samples received from a data interface means to generate an array of output data samples, each one of the array of input data samples is stored in the data interface over a data load time interval, and the predetermined time period is shorter than the data load time interval.

Another example (e.g. example 38) relates to a previously-described example (e.g. one or more of examples 31-37), further comprising: a data interface means coupled to the second subset of processing elements and to the hardware accelerator means, the data interface means sequentially transferring each one of the array of output data samples to the hardware accelerator means in accordance with the predetermined timing synchronization schedule.

Another example (e.g. example 39) relates to a previously-described example (e.g. one or more of examples 31-38), wherein the predetermined timing schedule indicates a periodicity with respect to when the hardware accelerator means is to execute the predetermined processing function on each one of the array of output data samples that is sequentially received from the second subset of processing means.

Another example (e.g. example 40) relates to a previously-described example (e.g. one or more of examples 31-39), wherein each one of the array of processing means utilizes data-driven synchronization such that, upon receiving a respective array of input data samples, execution of processing operations on the respective array of input data samples is triggered.

An apparatus as shown and described.

A method as shown and described.

CONCLUSION

The aforementioned description will so fully reveal the general nature of the disclosure that others can, by applying knowledge within the skill of the art, readily modify and/or adapt for various applications without undue experimentation, and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one implementation," "an implementation," "an exemplary implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The implementation described herein are provided for illustrative purposes, and are not limiting. Other implementation are possible, and modifications may be made to the described implementations. Therefore, the specification is not meant to limit the disclosure. Rather, the scope of the disclosure is defined only in accordance with the following claims and their equivalents.

The implementations described herein may be facilitated in hardware (e.g., circuits), firmware, software, or any combination thereof. Implementations may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to implementations described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the implementations described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A system on a chip (SoC), comprising:
an array of processing elements, each one of the array of processing elements being configured to execute processing operations on an array of input data samples in accordance with received instructions to generate an array of output data samples, and to delay transmission of the array of output data samples until expiration of a predetermined time period,
wherein the predetermined time period is started, for each one of the array of processing elements, upon execution of the processing operations; and
a hardware accelerator configured to execute a predetermined processing function on each one of an array of output data samples that is sequentially received from the array of processing elements in accordance with a predetermined timing synchronization schedule to sequentially generate respective sets of processed data samples,
wherein the sequentially-generated respective sets of processed data samples are used to perform wireless data communications.

2. The SoC of claim 1, wherein the expiration of the predetermined time period is based upon a counter configured to count up to a predetermined number of clock cycles associated with a clock signal, and
wherein the predetermined timing synchronization schedule is based upon the clock signal.

3. The SoC of claim 1, wherein each one of the array of processing elements is configured to receive a timer signal from a timer that is external to the array of processing elements that indicates the expiration of the predetermined time period.

4. The SoC of claim 1, wherein each one of the array of processing elements comprises a timer configured to indicate the expiration of the predetermined time period.

5. The SoC of claim 4, wherein the predetermined time period associated with the timer of each respective one of the array of processing elements is the same predetermined time period.

6. The SoC of claim 1, wherein the processing operations executed via each respective one of the array of processing elements are performed over a respective processing time interval based upon respectively received instructions.

7. The SoC of claim 6, wherein the predetermined time period is longer than a longest one of the respective processing time intervals.

8. The SoC of claim 1, wherein:
each respective one of the array of processing elements is configured to execute processing operations on an array of input data samples received from a data interface to generate an array of output data samples,
each one of the array of input data samples is stored via the data interface over a data load time interval, and
the predetermined time period is shorter than the data load time interval.

9. The SoC of claim 1, further comprising:
a data interface coupled to the array of processing elements and to the hardware accelerator, the data interface being configured to sequentially transfer each one of an array of output data samples to the hardware accelerator in accordance with the predetermined timing synchronization schedule.

10. The SoC of claim 1, wherein the predetermined timing schedule indicates a periodicity with respect to when the hardware accelerator is to execute the predetermined processing function on each one of the array of output data samples that is sequentially received from the array of processing elements.

11. The SoC of claim 1, wherein each one of the array of processing elements is configured to utilize data-driven synchronization such that, upon receiving a respective array of input data samples, execution of processing operations on the respective array of input data samples is triggered.

12. The SoC of claim 1, wherein the instructions received via each one of the array of processing elements identifies a manner in which to delay transmission of the array of output data samples until expiration of the predetermined time period, and
wherein each one of the array of processing elements is configured to delay transmission of the array of output data samples until expiration of the predetermined time period by executing the respectively received instructions.

13. A system on a chip (SoC), comprising:
an array of processing elements, comprising:
a first subset of processing elements, each processing element from among the first subset of processing elements being configured to execute processing operations on an array of input data samples in accordance with received instructions and to generate and transmit an array of output data samples;
a second subset of processing elements, each processing element from among the second subset of processing elements being configured to execute processing operations an array of input data samples in accordance with received instructions to generate an array of output data samples, and to delay transmission of the array of output data samples until expiration of a predetermined time period,
wherein the predetermined time period is started, for each one of the second subset of processing elements, upon execution of the processing operations; and
a hardware accelerator configured to execute a predetermined processing function on each one of an array of output data samples, which are sequentially received from the second subset of processing elements in accordance with a predetermined timing synchronization schedule, to sequentially generate respective sets of processed data samples,
wherein the sequentially-generated respective sets of processed data samples are used to perform wireless data communications.

14. The SoC of claim 13, wherein the expiration of the predetermined time period is based upon a counter configured to count up to a predetermined number of clock cycles associated with a clock signal, and
wherein the predetermined timing synchronization schedule is based upon the clock signal.

15. The SoC of claim 13, wherein each one of the second subset of processing elements is configured to receive a timer signal from a timer that is external to the array of processing elements that indicates the expiration of the predetermined time period.

16. The SoC of claim 13, wherein each one of the second subset of processing elements comprises a timer configured to indicate the expiration of the predetermined time period.

17. The SoC of claim 16, wherein the predetermined time period associated with the timer of each respective one of the second subset of processing elements is the same predetermined time period.

18. The SoC of claim 13, wherein the processing operations executed via each respective one of the array of processing elements are performed over a respective processing time interval based upon respectively received instructions.

19. The SoC of claim 18, wherein the predetermined time period is longer than a longest one of the respective processing time intervals.

20. The SoC of claim 13, wherein:
a first one of the second subset of processing elements is configured to execute processing operations on an array of input data samples received from a data interface to generate an array of output data samples,
each one of the array of input data samples is stored via the data interface over a data load time interval, and
the predetermined time period is shorter than the data load time interval.

21. The SoC of claim 13, further comprising:
a data interface coupled to the second subset of processing elements and to the hardware accelerator, the data interface being configured to sequentially transfer each one of the array of output data samples to the hardware accelerator in accordance with the predetermined timing synchronization schedule.

22. The SoC of claim 13, wherein the predetermined timing schedule indicates a periodicity with respect to when the hardware accelerator is to execute the predetermined processing function on each one of the array of output data samples that is sequentially received from the second subset of processing elements.

23. The SoC of claim 13, wherein each one of the array of processing elements is configured to utilize data-driven synchronization such that, upon receiving a respective array of input data samples, execution of processing operations on the respective array of input data samples is triggered.

24. The SoC of claim 13, wherein the instructions received via each one of the second subset of processing elements identifies a manner in which to delay transmission of the array of output data samples until expiration of the predetermined time period, and
wherein each one of the second subset of processing elements is configured to delay transmission of the array of output data samples until expiration of the predetermined time period by executing the respectively received instructions.

\* \* \* \* \*